United States Patent [19]
Gouterman et al.

[11] Patent Number: 5,186,046
[45] Date of Patent: Feb. 16, 1993

[54] SURFACE PRESSURE MEASUREMENT BY OXYGEN QUENCHING OF LUMINESCENCE

[75] Inventors: Martin P. Gouterman, Seattle; Janet L. Kavandi, Renton; Jean Gallery; James B. Callis, both of Seattle, all of Wash.

[73] Assignee: Board of Regents of the University of Washington, Seattle, Wash.

[21] Appl. No.: 570,275

[22] Filed: Aug. 20, 1990

[51] Int. Cl.$^5$ .................... G01L 7/00; G01N 9/00
[52] U.S. Cl. ........................ 73/147; 73/180; 73/705; 374/143
[58] Field of Search ............ 73/147, 700, 23.2, 23.29, 73/180, 115, 116, 117.4, 705; 374/143

[56] References Cited

U.S. PATENT DOCUMENTS

| | | | |
|---|---|---|---|
| 4,380,170 | 4/1983 | Dotzer | 73/147 |
| 4,774,835 | 10/1988 | Holmes et al. | 73/147 |
| 4,810,655 | 3/1989 | Khalil et al. | 436/138 |
| 5,070,729 | 12/1991 | Jensen | 73/147 |

FOREIGN PATENT DOCUMENTS 0283289 9/1988 European Pat. Off. .
0202134 9/1986 Japan ..................... 73/147

OTHER PUBLICATIONS

Bradley, L. C. III, "A Temperature-Sensitive Phosphor Used to Measure Surface Temperatures in Aerodynamics", *The Review of Scientific Instruments* 24(3);219-220, 1953.

Ardasheva, M. M., et al., "Measurement of Pressure Distribution by Means of Indicator Coatings", Translated from *Zhurnal Prikladnoi Mekhaniki i Tekhnicheskoi Fiziki* 4:24-30, Jul.-Aug., 1985.

Urbach, F., et al., "The Observation of Temperature Distributions and of Thermal Radiation by Means of Non-Linear Phosphors", *Journal of the Optical Society of America* 39(12):1011-1019, 1949.

Peterson, J. I., et al., "New Technique of Surface Flow Visualization Based on Oxygen Quenching of Fluorescence", *Rev. Sci. Instrum.* 51(5):670-671, 1980.

Noel, B. W., et al., "Environmental Tests of Thermographic Phosphors for Turbine-Engine Temperature Measurements", AIAA/ASME/SAE/ASEE 25th Joint Propulsion Conference, Monterey, Calif., Jul. 10-12, 1989.

McLachlan, B. G., "Surface Pressure Field Mapping Using Luminescent Coatings", *Abstract, 42nd Annual Meeting of the American Physical Society, Division of Fluid Dynamics*, Nov. 19-21, 1989.

Baker, H. D., et al., Eds., *Temperature Measurement in Engineering*, vol. II, Omega Press:Stamford, Conn., 1960.

Inteco, Optical Pressure Measurement System, Advertisement, undated.

Romano, V., et al., "Time-Resolved Thermal Microscopy with Fluorescent Films", *Appl. Phys.* B49:527-533, 1989.

Crowder, J. P., "Flow Visualization in Flight Testing", AIAA/SFTE/DGLR/SETP 5th *Biannual Flight Test Conference*, Ontario, Calif., May 22-24, 1990.

Crowder, J. P., "Recent Advances in Flow Visualization at Boeing Commercial Airplanes", *5th Int'l Symposium on Flow Visualization*, Prague, Czechoslovakia, Aug. 21-25, 1989.

Progress Report, NASA-Ames University Consortium, Sep. 21, 1988.

Progress Report, NASA-Ames University Consortium, Jan. 21, 1989.

Final Report, NASA-Ames University Consortium, Apr. 2, 1990.

Kavandi, J. L., Luminescence Imaging for Aerodynamic Pressure Measurements, Ph.D. Thesis, University of Washington, 1990.

*Primary Examiner*—Donald O. Woodiel
*Attorney, Agent, or Firm*—Christensen, O'Connor, Johnson & Kindness

[57] ABSTRACT

Methods and compositions for measuring the pressure of an oxygen-containing gas on an aerodynamic surface, by oxygen-quenching of luminescence of molecular sensors is disclosed. Objects are coated with luminescent films containing a first sensor and at least one of two additional sensors, each of the sensors having luminescences that have different dependencies on temperature and oxygen pressure. Methods and compositions are also provided for improving pressure measurements (qualitative or quantitive) on surfaces coated with a film having one or more types of sensor.

26 Claims, 31 Drawing Sheets

SURFACE PRESSURE MEASUREMENT BY OXYGEN QUENCHING OF LUMINESCENCE

This invention was made with government support under the following grants: NASA-Ames University Consortium under Interchange No. NCA2-296 and Interchange No. NCA2-474, and NASA Graduate Student Research Program Fellowship. The government may have rights in the invention.

TECHNICAL FIELD

This invention relates to surface pressure measurements based on quenching of luminescence by an oxygen-containing gas in contact with the surface of an object.

BACKGROUND OF THE INVENTION

Convenient and inexpensive methods for determining pressure maps of surfaces, particularly aerodynamic objects, have long been sought. Static pressures over the surface of an aerodynamic body are presently determined using pressure orifices or pressure taps, which are drilled into the surface of the body and connected via tubing to multiplexed electronic pressure scanners external to the surface of interest. Hundreds or even thousands of pressure orifices may be required to map an entire surface. Since the pressure orifices are usually separated by a significant distance, a continuous pressure map is not achieved. The current method for determining pressures between the orifices is to interpolate them by computational fluid dynamics (CFD). See Erisman, A. M. and Neves, K. W., *Sci. Am.* 257, 163 (Oct. 1987) and Jameson, A., *Science,* 245, 361 (1989).

Wind tunnel experiments provide the data to validate CFD models. Data is also used to gain an understanding of flow so as to guide development of new CFD models. A method for collecting continuous pressure data in wind tunnels would provide the information needed to eliminate some of the uncertainty in CFD models.

Several methods have been used in an attempt to provide a convenient method for determining static pressure on aerodynamic surfaces. Digital holographic interferometry is one process whereby interference fringes are counted, and the distances between fringes are processed into pressure distribution information of the surface of an airfoil. See Merzkirch, W., *Flow Visualization* (Academic Press, New York, 1974). This technique, however, is valid only for symmetrical airfoils.

In 1980, Peterson and Fitzgerald (Peterson, J. I. and Fitzgerald, R. V., *Rev. Sci. Instrum.,* 51, 670 (1980)) proposed oxygen quenching of fluorescent dyes for flow visualization in a wind tunnel. In their experiment, the luminescent dye was adsorbed onto silica particles. The coating was rough and adherence was a problem. No attempt at quantitation was made.

The methods and compositions described herein are based on molecular photoluminescence. Luminescence is a broad term which encompasses both fluorescence and phosphorescence. Electromagnetic radiation in the ultraviolet or visible region is used to excite molecules to higher electronic energy levels. The excited molecules lose their excess energy by one of several methods. Fluorescence refers to the radiative transition of electrons from the first excited singlet state to the singlet ground state ($S_1 \rightarrow S_o$). The lifetime of fluorescence is relatively short, approximately $10^{-9}$ to $10^{-7}$ seconds. However, intersystem crossing from the lowest excited singlet state to the triplet state often occurs and is attributed to the crossing of the potential energy curves of the two states. The triplet state so produced may return to the ground state by a radiative process known as phosphorescence. Phosphorescence is the radiative relaxation of an electron from the lowest excited triplet state to the singlet ground state ($T_1 \rightarrow S_o$). Because the transition that leads to phosphorescence involves a change in spin multiplicity, it has a low probability and hence a relatively long lifetime ($10^{-4}$ to 10 seconds). Also, due to the lower energy of the triplet state, the wavelength of phosphorescence is longer than the wavelength of fluorescence. Herein, the term "sensor" is used to refer to luminescent molecules.

In one embodiment of the present invention, a phosphorescent porphyrin is coated on the surface of an object. The quenching of phosphorescence emitted by the porphyrin upon excitation is used to quantitatively measure the static pressure on the surface of the object.

Porphyrins are macrocyclic tetrapyrrole structures, some of which are known to phosphoresce when exposed to specific frequencies of light. See Falk, J. E., Porphyrins and Metalloporphyrins, Vol II (Elsevier, Amsterdam) chap. 1, 1964; and Gouterman, M. in The Porphyrins, Vol III, Physical Chemistry, Part A, Ed. D. Dolphin (Academic Press, New York), chap. 1, 1978). This phosphorescence is also known to be quenched by oxygen. See Cox, G. S. and Whitten, D. G., *Chem. Phys. Let.* 67, 511 (1979) and Rossi, E. et al., *Photochem. Photobiol.* 42, 447 (1981).

The oxygen quenching properties of platinum porphyrins have been used for the determination of oxygen in vivo. For example, U.S. Pat. No. 4,810,655 is directed to methods and compositions for measuring oxygen concentration, particularly for monitoring oxygen in the blood with a fiber-optic catheter.

In one important aspect of the present invention, the inventors have recognized that there is a problem with prior techniques of pressure measurement based on oxygen quenching of luminescence. In particular, the phosphorescence of certain porphyrin derivatives has a temperature dependency in addition to a pressure dependency. Accordingly, pressure measurements based on a coating containing a single sensor of this type can be in error if there is a fluctuation in the temperature. Previously, it has been reported that there was no temperature dependence of the brightness of a particular luminescent indicator coating. See Ardasheva, M. M., et al., *Zhur. Prik. Mek.* 4, 24–30 (1985), English translation. To the contrary, the present inventors have found that for the systems reported herein, the temperature dependency of luminescence is an effect which must be corrected for when temperatures on the surface of an object vary more than approximately 0.5° C.

There are also previous reports to the effect that, independent of pressure measurements, temperature sensitive phosphors have been used to measure surface temperature of aerodynamic surfaces. See, for example, Bradley, L. C., *Rev. Sci. Instr.* 24(3), 1953; and Baker, H. D. et al., Temperature Measurement in Engineering, Vol II (Omega Press, Stamford, Conn.) 190–191 (1960). None of these prior reports have incorporated two different types of sensors as disclosed herein into a single film for improved pressure measurements of surfaces.

SUMMARY OF THE INVENTION

It is therefore an object of the present invention to provide methods and compositions for measuring the pressure of an oxygen-containing gas on a surface, which do not suffer from the drawbacks of temperature dependency of luminescence.

It is another object of the present invention to provide methods and compositions for measuring the pressure of an oxygen-containing gas on a surface, which does not require calibration of the measurement by means of a measurement of luminescence under a static condition.

The above and other objects of the present invention have been achieved by the present invention, which embodies several discoveries. First, the inventors have determined that there is a temperature dependency of luminescence of luminescent porphyrins, in addition to the requisite pressure dependence of luminescence, and that this temperature dependency of luminescence can be corrected by providing a second luminescent molecule (i.e., sensor) that has a temperature-dependent luminescence but pressure independent luminescence.

Another discovery of the present invention is that calibration of pressure measurements against surfaces to a standardized condition may be accomplished by providing, in addition to a first sensor whose luminescence is pressure dependent, another type of sensor whose luminescence is relatively independent of both temperature and pressure.

Yet another discovery of the present invention is that the intensity of luminescence for even a single sensor may be dramatically improved by providing white backing to the sensor coating on a surface of interest.

In the method of the present invention, an object coated with an oxygen-permeable film comprising sensors A and B, or sensors A, B, and C is provided. Sensor A produces luminescence at an emission wavelength $\lambda_A$ of intensity $I_A$ that is dependent upon temperature and oxygen pressure. Sensor A is preferably a phosphorescent porphyrin. Sensor B produces luminescence at an emission wavelength $\lambda_B$ of intensity $I_B$ that is dependent on temperature and independent of oxygen pressure. Sensor C produces luminescence at an emission wavelength $\lambda_C$ of intensity $I_C$ that is independent of oxygen pressure and independent of temperature. These emission wavelengths are not identical; that is, they are independently measurable. When the coated object is irradiated with wavelengths capable of exciting each of the sensors contained therein, luminescent measurements may be conducted. In carrying out the method of the present invention, the coated object is irradiated while an oxygen-containing gas is flowing past the surface of the object. While the coated object is irradiated, the luminescences of each of the sensors are collected and the intensities of the emissions are compared with each other and/or to predetermined calibration values to produce a measurement of the pressure of the oxygen-containing gas on the surface.

Theoretically, the intensity of luminescence can be related to oxygen pressure (and hence total pressure) by the following equation (a form of Stern-Volmer law):

$$(I_o/I) = A + B(p/p_o) \quad (1)$$

where I is the intensity at pressure p and $I_o$ is the pressure at a reference pressure $p_o$, and A+B are constants that added together equal one. From the collected luminescences emitted by a plurality of sensors, it is possible to create two ratio fields:

$$I_{oA}/I_A = r_1 I_B/I_{oB} = r_2 \quad (2)$$

where the ratio or $r_1$ is primarily pressure dependent, but also has some temperature dependence. The ratio $r_2$ is temperature dependent only. Thus, $r_2$ can be used to obtain accurate values of $p/p_o$ from $r_1$. In an alternative embodiment, $I_{oA}$ and $I_{oB}$ are replaced by $I_C$, the emission from sensor C that is independent of oxygen pressure and independent of temperature. Even if the luminescence properties of the tree sensors are not ideal (e.g., the sensor B has a temperature dependence and slight pressure dependence), this difficulty can be taken care of in a calibration.

Also disclosed are paints that contain the necessary molecular species to carry out the methods described above. For example, a pressure sensitive paint for purposes of the present invention will generally comprise sensors A and B, or sensors A, B, and C, where the sensors are as detailed above; a solvent; and molecules that form a film containing the sensors upon evaporation of the solvent. The pressure sensitive paint can be used to coat an object for carrying out the methods described above.

DETAILED DESCRIPTION OF THE PREFERRED EMBODIMENTS

Figure 1:
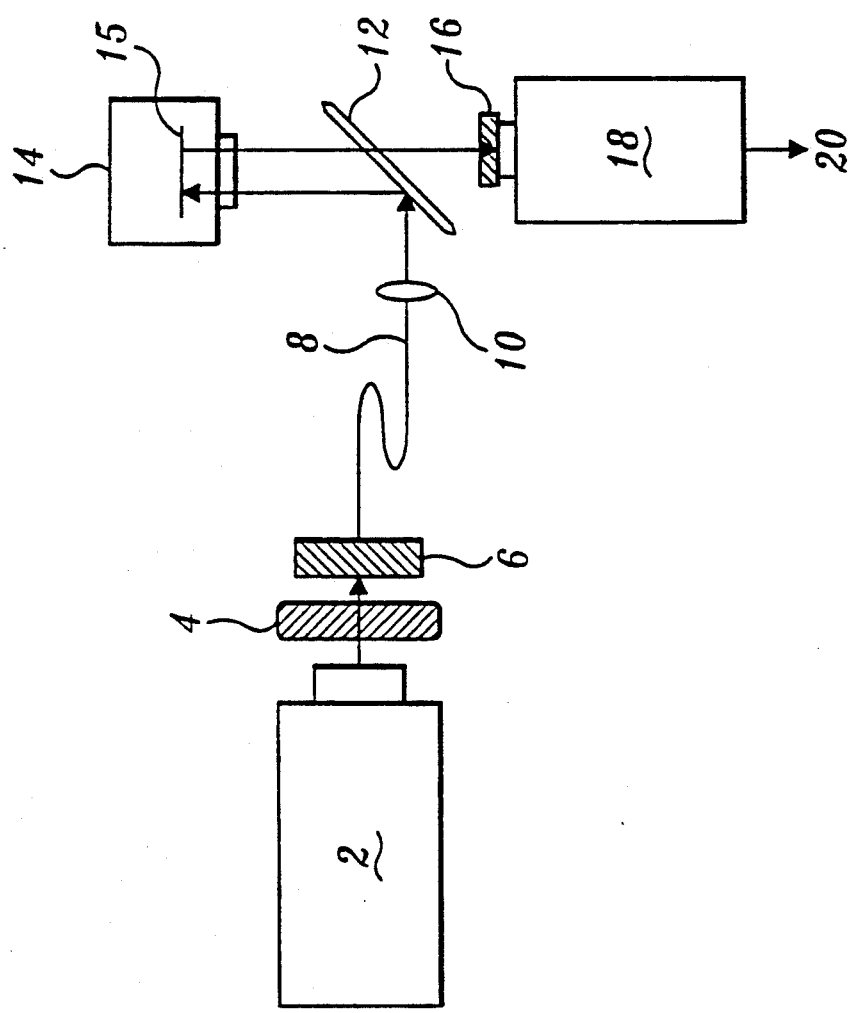
FIG. 1 shows a schematic drawing of the instrumentation used for calibration.

The present invention focuses on an oxygen-sensitive luminescent film coating for pressure measurement and mapping of surfaces and methods based thereon. Generally, the purpose of the present invention is to quantitatively map static pressure distribution and provide a new "real-time" flow visualization method for surfaces, especially aerodynamic surfaces. The methods and coatings described herein can be tested both in wind tunnels and in actual flight.

The object to be coated in accordance with the present invention can be any one where surface pressure is desired to be measured or visualized. Preferably, the object will be one that has some aerodynamic application, including airfoils of all types, rotors (e.g., of helicopters), propellers, fixed wings, turbine blades, nacelles, entire aircraft and other difficult-to-model surfaces, missiles, and the like.

In order for an oxygen-sensitive sensor to produce desired results, it must first be applied to the surface of interest. Aerodynamic testing requires a very thin and smooth surface. For example, in a wind tunnel a thin, smooth surface is required to avoid accidental "tripping" of the airflow over the surface. In general, the luminescence response of the film is independent of thickness, so that even if thickness is non-uniform, the pressure-measuring method described herein could still be used with sufficient accuracy. However, uniform films are preferred.

The specific method to be used for coating is not necessarily limited as long as the desired smoothness of coating is achieved. The preferred method involves an airbrush spraying technique where the reservoir cup is filled with solution containing the sensors and polymer resin. The solution is aspirated using an inert gas which then directs the spray onto the surface.

Other possible methods of producing uniform films are an electrostatic method, a robotics method and a shrink fit method. The electrostatic method involves charging the surface to be painted, and then charging the paint with the opposite charge so that the paint is attracted to the surface. This method minimizes overspray while producing a thin and uniform coating.

The robotics method involves using a computer-controlled robotics sprayer that is capable of producing very uniform films on non-uniform surfaces. This method might be useful for coating an airfoil with a clear, smooth, and uniform film.

The "shrink-fit method" involves the following steps. First, a clear, smooth, uniform film is prepared by pouring a polymer solution onto a smooth surface (e.g., glass or a solid organic polymeric surface), and allowing it to dry. After drying, the film is peeled off and placed on an airfoil. Employing a shrink-fit method involves tightly wrapping the polymeric film around the airfoil. Then, both are heated and returned to room temperature. This procedure can provide a tight adherence of the polymer to the surface.

The mode of application of the film should generally be such that the resulting film are very thin (preferably approximately 10–20 microns in thickness). Film thickness may be determined using an ultraviolet/visible spectrometer by measuring the optical absorption of a sensor in the film and then applying the well-know Beer's law. Thickness should not decrease permeability, but, rather, should only slow the rate of diffusion and therefore the rate of response. Oxygen permeability will vary with the particular polymer chosen. Standard methods of measuring oxygen permeability with particular polymer films may be used to evaluate the permeability.

The sensor must also be uniformly distributed in the film. For porphyrins, the individual molecules should be separated by at least about 50 Å to prevent triplet-triplet deactivation. This intermolecular separation corresponds to a porphyrin concentration of about $10^{-2}$ molar.

Generally, thin, uniform films containing the sensors are prepared using precursor compositions comprising the sensors dissolved in a solvent along with a suitable film-forming material. Functionally, the solvent must be able to dissolve the sensor molecule and be sufficiently volatile to produce a smooth film. The solvent is preferably a volatile organic material that will dissolve the sensors and evaporate within a convenient time after application of the composition into the surface. The specific nature of the solvent is not critical for the purposes of the present invention and may range over a wide variety of materials. Nonlimiting examples of the solvent are: 1,1,1-trichloroethane, butyl alcohol, and isopropyl alcohol.

The final films are also not believed to be limited except that they must be sufficiently oxygen permeable so that an oxygen-containing gas can quench luminescence of the sensors contained in the film during pressure measurements and they must be compatible with the sensors they contain. Generally, the film-forming material will produce the film on the surface of the object upon evaporation of the solvent. Thus, the film-forming material will preferably be chemically identical to the final film material itself, dissolved in a solvent. However, the film-forming material may also be a film precursor, such as an oligomer that forms the final film during or after evaporation of the solvent. Film formation may occur as a result of chemical reaction of a precursor with constituents of air, the action of heat or light on the precursor, or chemical interaction of different precursor molecules contained in the solvent, etc. In a particularly preferably embodiment, a silicone polymer is employed as the film-forming material. For example, a thermoplastic silicone copolymer, such as Petrarch MB or a dimethyl polysiloxane polymer solution (e.g., GP-197, Genesee Polymers Corporation), may be used as the film-forming materials. In this example, upon evaporation of the solvent, the final polymeric film is deposited without any significant chemical reaction taking place. Silicone co-polymers such as silicone-polyurethene or silicone-polyester co-polymers may also be used as the film-forming polymers.

Fortuitously, it has been discovered that if the surface of the object to be coated with the luminescent film described above is first rendered white, the emitted luminescence is brighter than if the surface is other than white, e.g., a black surface. In fact, the luminescence is almost undetectable when the film covers a black surface. Although not wishing to be bound by a particular theory of operation, the inventors believe that a white background provides a reflective surface off of which unabsorbed exciting light can scatter back into the film containing the sensor. The light, therefore, has a second chance to excite a sensor molecule. The enhancement effect is so large, it is suspected that may of the photons make multiple passes through the film due to total internal reflection properties of the film. The emission from the sensor is also scattered off the white surface so that a detector can detect a large signal.

The choice of the type of white covering for the backing is important. Some white coatings have been observed to darken after long exposure to air and ultraviolet light. Some coatings, when covered by a luminescent film, are susceptible to degradation, either by the exciting light or by singlet oxygen produced in the photochemical reaction of oxygen with the luminescent species (e.g., a porphyrin). Thus, the white covering should be insensitive to the exciting light and/or a singlet oxygen quencher should be added to the covering.

Exemplary white coverings are paints such as Rust-Oleum White Gloss Paint and Krylon Glossy White Spray Paint (#1501). The Krylon has proved advantageous for the present purposes, as it exhibits the least amount of darkening after extended exposure to the exciting light. For wind tunnel tests, a generic commercial paint, commonly used for painting aerodynamic models may be used for the white backing.

The backing should be as white as possible, since yellowed or beige tones do not produce optimal signal enhancement. It is also contemplated that the white covering could be a composite or a chemical modification of the surface, such as an oxide coat, as long as the surface is smooth and is able to increase the luminescence signal.

The sensors of the present invention are roughly divided into three types, represented by sensors A, B and C. In some embodiments, the luminescence coatings of the present invention will be comprised of sensors A and B, or sensors A, B, and C. The properties of these three types of sensors are as follows:

Sensor A: This sensor produces luminescence at $\lambda_A$ with an intensity $I_A$ that is dependent on pressure but also has some temperature dependence (for example, platinum octaethylporphyrin (PtOEP) in a silicone polymer).

Sensor B: This sensor produces luminescence at $\lambda_B$ with an intensity $I_B$ that is dependent on temperature but which has little or no pressure dependence.

Sensor C: This sensor produces luminescence at $\lambda_C$ with an intensity $I_C$ that is relatively independent of temperature and pressure.

A preferred type of sensor A is a phosphorescent porphyrin. The most preferred sensor A is platinum octaethylporphyrin, abbreviated herein as PtOEP. This metalloporphyrin produces phosphorescence, the intensity of which can be directly related to the partial pressure of oxygen in the atmosphere based on the theoretical considerations presented above. The excitation/emission spectrum for PtOEP displays a strong excitation band in the near ultraviolet region of the visible spectrum at approximately 380 nm and a weaker band in the green region at approximately 540 nm. PtOEP phosphoresces in the red region of the visible spectrum at approximately 650 nm. PtOEP is the preferred sensor A due to its large phosphorescence quantum yield (approximately 90%) and its long triplet lifetime (approximately 100 microseconds).

Sensor B produces luminescence that is dependent upon temperature but has little or no pressure dependence. Some examples of sensor B are the following: rhodamine B, yttrium vanadate: europium microcrystals, and europium thenoyl trifluoroacetoacetonate.

Figure 4:
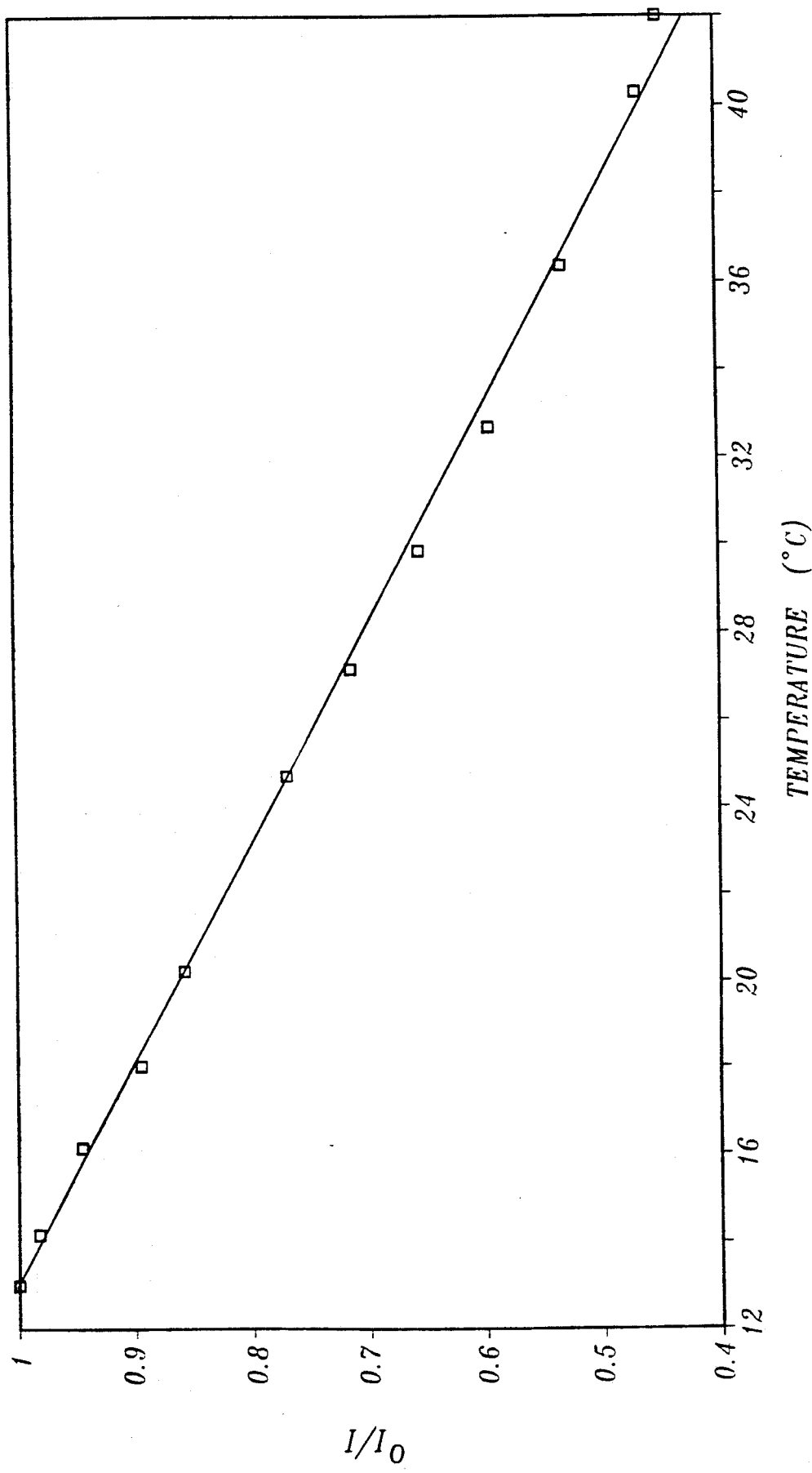
FIG. 4 shows an in-lab calibration curve for rhodamine B in silicone resin sprayed onto an aluminum plate covered with white paint taken with the apparatus shown in FIG. 1.

The preferred sensor B is a fluorescent species. The short lifetime inherent to fluorescence can statistically decrease the change of oxygen quenching to the degree that the luminescence is virtually unaffected by oxygen. The most preferred type of fluorescent species is rhodamine B (a laser dye). Reportedly, rhodamine B has a fluorescent lifetime of only four nanoseconds and a strong fluorescent yield that is dependent on temperature. See Romano et al. *Appl. Phys.* B49, 527-533 (1989), who have demonstrated the ability of this molecule to be incorporated into a thin film for temperature distribution mapping for biological purposes. FIG. 4 shows a laboratory calibration curve for rhodamine B in silicone resin sprayed onto an aluminum plate covered with white paint taken with the apparatus of FIG. 1. The sample chamber (14) is thermally regulated and temperature is validated with an Omega Model HH71 thermocouple thermometer with digital readout. In FIG. 4, the intensity I at temperature T is ratioed to the intensity $I_o$ at temperature $T_o$ (the lowest temperature measured). The slope from a least squares fit is reported as −0.01945 (or approximately 2% per degree C) with an intercept of 1.24619.

The inventors have tried other materials for sensor B. In particular, when yttrium vanadate: europium was utilized in microcrystalline form, no pressure dependence was found. It was discovered that it should be produced in microcrystalline from to shield the metal center from quenching by molecular oxygen. Moreover, phosphorescence surprisingly increased with temperature, roughly 0.8%/° C. Lanthanum oxysulfide: europium microcrystals are also suitable, but they have a smaller temperature response, 0.4%/°C. "Microcrystalline" refers to crystals having a size in the range of about 0.5-2 microns.

Sensor C is a molecular species that luminesces at an intensity that is relatively independent of temperature and pressure conditions. It is contemplated that a luminescent molecule exhibiting little or no temperature dependence of luminescence could be encapsulated into a gas-impermeable polymer (e.g., polyacrylonitrile) to remove pressure sensitivity. It might also be possible to use microcrystals of suitable luminescence sensors since they show no pressure dependence.

To carry out the methods of the present invention, a coating composition (i.e., a paint) in accordance with the present invention is coated onto a surface of an object as described above and then the object is irradiated with one or more wavelengths of light that will excite each of the sensors contained in the coating. It is not necessary that the exciting or emission wavelengths be different from one sensor to the other. In fact, it might be preferable under some circumstances to have a common excitation or emission wavelengths for each of the sensors contained in the coating. However, with common excitation wavelengths, the emission wavelengths of the different sensors must be different and have adequately separated maxima (e.g. 20 mm) so that they may be measured separately. Alternatively, with common emission wavelengths, the excitation wavelengths of the different sensors must be different and have adequately separated maxima.

In a preferred embodiment, the emitted luminescences are different and are measured separately by rotating different interference filters in front of a detection device, such as a video during constant illumination. Coordinating the rotation with flash illumination excitation of the coating may offer an alternative, so that an image of each of the luminescences can be taken with a different flash. Under the circumstance to flash illumination, there may be some variation in intensity from flash to flash. In this case, the system should allow a detector to receive some of the light from the flash so as to compensate for these variations. For example, a photodiode monitor receiving some of the light might be employed to minimize the problem of variability in the flash intensity.

Image Capture and Analysis

In its broadcast form, the present invention provides for pressure measurements on a surface by detecting the luminescence of at least one sensor on a surface and then processing the measurement of intensity of luminescence to enable it to be related to the pressure on the surface of the object.

In general, the apparatus used to measure pressure will comprise a light source for excitation of the sensors in the film while an oxygen-containing gas is in contact with the film, means for detecting each of the luminescences emitted by the sensors contained in the film, and means for processing the raw data, preferably into ratios of intensities that are related to pressure of the oxygen-containing gas in accordance with the theoretical relationship discussed above.

A preferred embodiment of an apparatus for pressure calibration measurements is shown in FIG. 1. In this FIG., (2) is a light source, such as a Xenon arc lamp (for example, Oriel Corporation Model 6137, powered by an arc lamp power supply No. 8510-2). The light from the source is generally filtered through water (4) to remove the infrared and near-infrared wavelengths, then through a bandpass interference filter (6) to obtain the appropriate excitation wavelength (e.g., a Melles Griot 50 nm bandpass interference filter centered at 400 nm). In order to form a spatially uniform irradiation beam, the light may be passed through a fiber-optic cable (8) and re-collimated with a lens (10) (e.g., a 4 inch focal length quartz lens). The collimated light then strikes a dichroic mirror (12) (e.g., a Corion dichroic mirror), which reflects light of wavelengths below a cutoff value (e.g., 500 nm) and transmits light of wavelengths above the cutoff value (e.g., 500 nm). The exciting light, after reflecting off the dichroic mirror, is directed through a porthole into a sealed pressure chamber (14), where it impinges on a thin film of the sensors (15); e.g., PtOEP in silicone resin coated onto a white-painted surface such as aluminum). The pressure in the pressure chamber can be carefully controlled for calibration purposes by means of a mechanical pump (not shown) attached to the pressure chamber by pressure tubing. Activation of such a pump and careful adjusting of the valves produces the desired pressure within the chamber. Pressure may be monitored and confirmed by standard pressure-measuring means (e.g., a piezoresistive pressure transducer, Omega Model #PX81, a Granville-Phillips 275 convectron gauge or a closed tube manometer).

From the pressure chamber (14), both the reflected light and the luminescence pass out of the pressure chamber porthole. Wavelengths less than the cutoff value are deflected while those greater than the cutoff value are transmitted through the dichroic mirror. The luminescent light then passes through a second bandpass interference filter (16) (e.g., a Melles Griot 50 nm bandpass interference filter centered at 650 nm) and into the detector (e.g., a video camera (18)). Thereafter, the detected luminescent signal is sent to a computer or video recorder for processing (20).

In an apparatus that is not designed primarily for calibration as is the apparatus in FIG. 1, instead of a pressure chamber, the coated object would be in any desired environment in which an oxygen-containing gas is flowing past the object. For example, the object could be in a wind tunnel or could be in the open air.

Generally, the calibrations made possible by the inclusion of sensors B and C may be conducted as follows:

For a given area on the surface to be measured, the luminescent intensities of sensors A, B and C are measured. In order to use sensor B to correct for temperature variation across the surface, it will be necessary to choose a reference temperature. The reference temperature may be the temperature prevailing across the surface of interest, under ambient "wind-off" conditions. Other convenient temperatures relevant to the pressure measurement may be chosen, such as the high or low extreme conditions. After measuring the intensity of luminescence of sensor B, $I_B$, this measurement is compared to a predetermined calibration curve that relates $I_B$ to temperature, to thereby obtain a temperature measurement. Once the temperature has been determined, the intensity of luminescence of sensor A, $I_A$, may then be corrected for any temperature variation from the reference temperature by use of a second predetermined calibration curve or matrix that relates $I_A$ and temperature. If only phosphors A and B are present, then a temperature calibration may be conducted, but calibration to a reference condition mast be generated by carrying out a separate measurement under standardized conditions, for example, under a "wind-off" condition. An alternative method would involve a third sensor, C, whose intensity, $I_C$ would be used as a standard condition, therefore removing the necessity for the "wind-off" measurement. Finally, the calibrated $I_A$ measurement is related to pressure of the gas in the measured area of the surface via the Stern-Volmer equation (see Equation (1) above). The pressure measurement may then be compared or displayed as desired to show a pressure profile across the entire surface.

The following are some examples of calibration equations that may be used in conjunction with the above-described methods (two possibilities are provided).

Inverse least squares matrix method:

$$C = RB$$

$$\begin{bmatrix} (p/p_o)_1 & T_1 \\ (p/p_o)_2 & T_2 \\ \cdot & \cdot \\ \cdot & \cdot \\ (p/p_o)_j & T_j \\ \cdot & \cdot \\ \cdot & \cdot \\ (p/p_o)_n & T_n \end{bmatrix} = \begin{bmatrix} r_{11} & r_{21} \\ r_{12} & r_{22} \\ \cdot & \cdot \\ \cdot & \cdot \\ r_{1j} & r_{2j} \\ \cdot & \cdot \\ \cdot & \cdot \\ r_{1n} & r_{2n} \end{bmatrix} \begin{bmatrix} b_{11} & b_{12} \\ b_{21} & b_{22} \end{bmatrix}$$

where $(r_{1j}, r_{2j})$ are $(r_1, r_2)$ defined in Equation (2) for point j on a surface. The response matrix R s mean-centered and the B matrix is estimated by calibration in the laboratory and is then used to predict $p/p_o$ and T in practice. (This is shown for two sensors. If sensor C is used, $I_C$ may replace the $I_{oA}$ and $I_{oB}$ in the equation).

Alternative:

$$p/p_o = \alpha + \beta(I_{oA}/I_A) + \gamma(I_B/I_B) \qquad (4)$$

where $\alpha$, $\beta$, and $\gamma$ are estimated in a laboratory calibration and are used to predict $p/p_o$ in practice. (Again, $I_{oA}$ and $I_{oB}$ may be replaced with $I_C$ if a third sensor is utilized).

Intensity information provided by the pressure-sensitive film is preferably processed by digital image processing, the quantitative method for recording and ratioing data to produce calibration curves and pressure maps. Digital image processing refers to the manipulation of images by computers. The fundamental purpose of the image processing system is to digitize, store, and process an image to extract desired information. The vidicon or solid state cameras preferably employed are the primary inputs to a computer imaging system. As a camera scans an image, the resulting arrays of light intensities are converted into analog electrical signals. If performed in "real-time," a new image will be scanned 30 or 60 times per second. A single image frame contains two fields of lines—an odd field made up of all the odd-numbered lines, and an even field made up of all the evennumbered lines. The video device produces horizontal sync pulses that separate individual lines of data, and vertical sync pulses that separate entire fields of data. Each field is acquired in 1/60th of a second. By combining, or interlacing the fields, a complete image frame may be displayed every 1/30th of a second.

From the camera, the analog video signal is then digitized. During this process, the image is divided into horizontal rows of adjacent pixels (i.e., corresponding to the areas of the surface in which individual luminescence measurements are made). The spatial resolution of the digitized frame is expressed as a matrix, with a number of lines (rows) into which the image is divided by the number of pixels (columns) per line. Typical spatial resolutions are 256 lines by 256 pixels, or 512 lines by 512 pixels. A second type of resolution is the brightness or gray scale resolution. At each pixel location, the intensity is quantified and assigned a gray level value. 8-bit data is common and corresponds to 256 separate levels of gray ranging from black to white.

Once the image is captured, digitized, and stored, it is subject to digital image processing, by which the image is altered through some operation to extract the desired information. In a preferred embodiment, several frames of each image are added together, then summed frames of dark noise are subtracted from summed frames of "wind-off" and "wind-on" data. The "wind-off" frames are then divided by the "wind-on" frames to obtain the desired intensity ratio information, $I_o/I_A$. If the film contains a sensor that is independent of both temperature and pressure, it would not be necessary to measure "wind-off" data for calibration.

Referring again to FIG. 1, in a preferred embodiment, the luminescent light emitted by the coated object is collected by a photographic lens and detected by a camera (18). Preferred types of cameras are a silicon diode array vidicon camera (RCA TC-2000) or a charge-coupled device (CCD) video camera (e.g., Sony XC-57). To achieve a linear response of the video output of the camera with respect to incident light, the automatic gain control (AGC) is disabled and gamma for the camera is set to unity. For data acquisition, the video output from a camera may be input into a computer. For example, an IBM PC/AT personal computer equipped with a frame grabber board (Truevision, TARGA-8), may be advantageously employed. The TARGA-8 board digitizes the video signal to 8-bits and stores the image onto 512×480 discrete pixel locations. Preferably, the data is digitized by means of a software package over a specified area. Data from wind tunnel tests has been collected by a Macintosh II computer equipped with a data translation Quick Capture ™ frame grabber board. The Quick Capture ™ board has a spatial resolution of 640×480 square pixels and also captures 8-bit monochrome images. The software package employed by the inventors in connection with several tunnel tests, Image 2.0, was created by the National Institutes of Health. For purposes of signal averaging, several images may be added together and preferably stored as a 16-bit file. The software has been modified so as to allow ratioing of entire 16-bit files. Following image processing, the modified image may be viewed on screen and a hard copy of the image may be produced.

Figure 5:
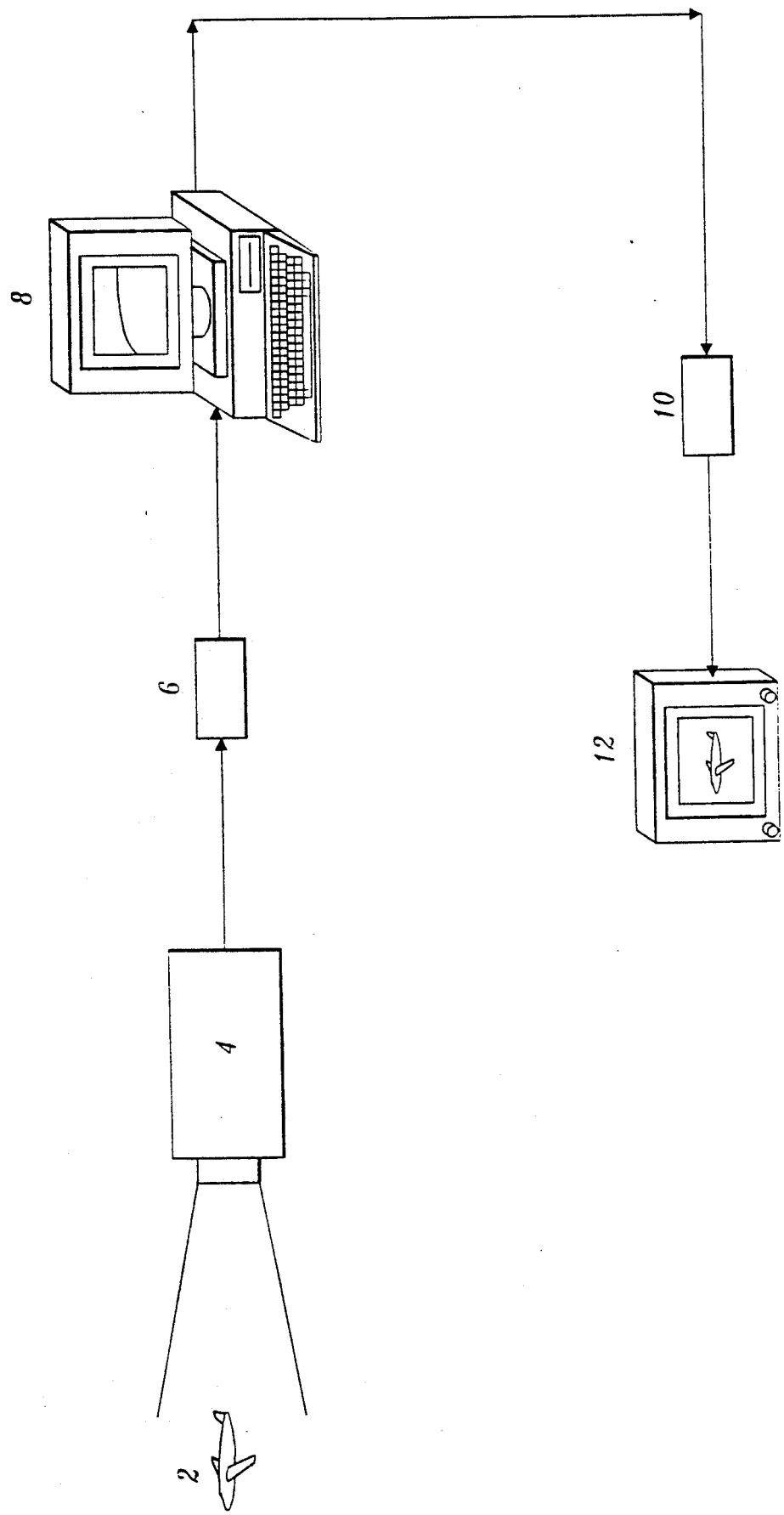
FIG. 5 shows a schematic of an image processing sequence.

FIG. 5 shows a schematic image processing sequence. The subject (2) is irradiated with exciting light and the emitted phosphorescence is collected by video camera (4). The image is then digitized by an A/D converter (6) inside a computer (8) and then the processed image is stored. Thereafter, the image is converted to an analog signal by a DAC converter (10) also inside the computer (8), and finally the processed image is viewed on a video monitor (12).

In the above examples, the inventors do not intend to limit the invention to a particular type of camera, computer, software or frame buffer board, etc.

From the above description, and based on the example presented below, the inventors have demonstrated a novel method of qualitative flow visualization representing pressure and temperature changes on the surface of an object.

The following are some additional uses contemplated by the inventors for the compositions and methods disclosed herein:

(1) Flow visualization: PtOEP is quenched by oxygen but not by other gases, such as nitrogen, argon, and the like. Therefore, if a non-quenching gas, preferably nitrogen, were forced out through small orifices along the leading edge of, e.g., an airfoil in a wind tunnel, the wind would blow the nitrogen across the wing according to the flow characteristics and cause the luminescence to be brighter where nitrogen came into contact with the porphyrin. (The nitrogen would inhibit quenching by oxygen). The result is a flow pattern characteristic of the particular conditions at the time of the experiment. A distinct advantage of this method over many present methods is the ability of the material to return to its original state immediately following the experiment. The experiment may be repeated time after time with little or no reconditioning required for extended exposure to the exciting light.

(2) In-flight studies: It is feasible to use the present methods on airplanes in flight. The coating would be placed on a part of the aerodynamic surface. From inside the plane, the surface would be illuminated by excitation sources and monitored, preferably by video cameras. The experiments would preferably be done at night to avoid interference from stray light. If very bright excitation were used (e.g. flash or lasers synchronized with fast shutters on the video camera), it should be possible to work in the presence of background light.

The following examples are presented to illustrate the advantages of the present invention and to assist one of ordinary skill in making and using the same. These examples are not intended in any way to limit the scope of the disclosure or the protection granted by letters patent hereon.

EXAMPLES

Instrumentation

A schematic of the instrumentation used to verify the assertion that thin films of silicon polymer containing PtOEP will exhibit a luminescence whose oxygen pressure dependence obeys the Stern-Volmer law as shown in FIG. 1. This FIGURE is discussed in detail above.

Materials

The molecular pressure sensor used in this investigation, PtOEP, was selected for its large phosphorescence quantum yield (approximately 90%) and its long triplet lifetime (approximately 100 $\mu$s). These characteristics are similar to that of platinum etioporphyrin, which was reported some time ago. The molecule phosphoresces at approximately 650 nm when irradiated with light of 380 nm.

The PtOEP solution is prepared by mixing 0.10 gram of PtOEP in one liter of Genesee Polymers GP-197 dimethylsiloxane polymer solution. The solution is spray coated onto the surface of interest. The solvent (mainly 1,1,1-trichloroethane) evaporates, leaving a smooth film. Best results are obtained by the application of several thin coats, and allowing each coat to dry between applications. It has also been found that precoating the surface with a commercial epoxy based white spray paint, such as a white Krylon spray paint, prior to PtOEP application, greatly increases the luminescence intensity signal as seen by the camera. The PtOEP film, itself, is very thin (between about 10 and 20 $\mu$m). Through experimentation, it has been determined that the $I_o I$ ratios are not significantly affected by variations in thickness over this range.

Results

Figure 2:
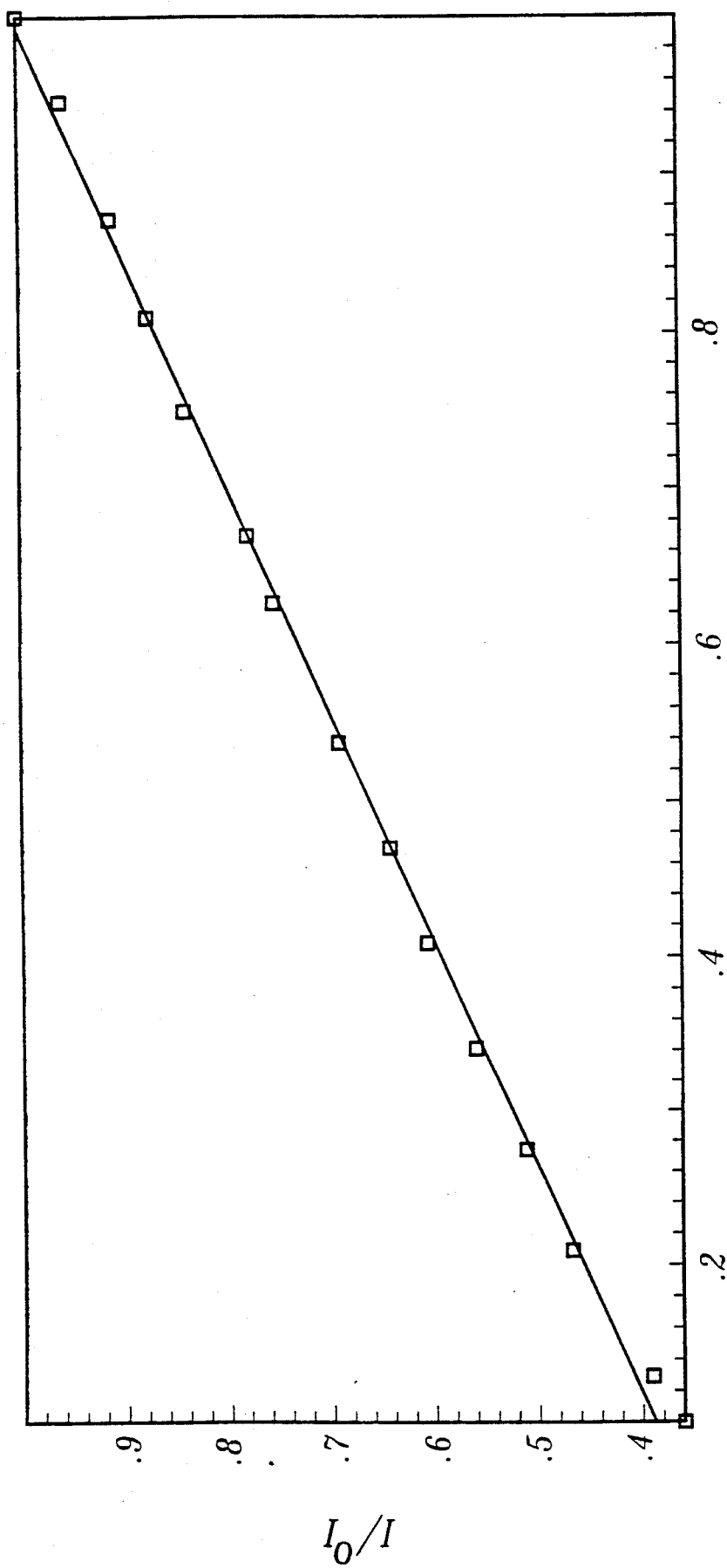
FIG. 2 shows a calibration curve for platinum octaethylporphyrin in silicone resin sprayed onto an aluminum plate covered with white paint, taken with the apparatus of FIG. 1. $I_o$ is the phosphorescence intensity at atmospheric pressure, $p_o$. I is the phosphorescence intensity at pressure p. In this graph $FT(I_o/I) = A + B(p/p_o)$; with A=0.32 and B=0.70, the values from a linear least squares fit.

Laboratory calibration curves are determined by taking phosphorescence intensity readings (gray level values) of a PtOEP sample over a pressure range of approximately 0.10 to 1.0 atmosphere. Intensity values for a specified square of 100 pixels near the center of the video image are obtained by averaging the values for five different frames at each pressure. The standard deviation for the averaged readings is typically less than one part in two hundred. Dark noise values, taken while the camera lens is covered, are subtracted from intensity readings. The resulting intensity reading at 1.0 atmosphere, or ambient pressure, $p_o$, is taken to be $I_o$. The data indicates a nearly linear relationship between $I_o/I$ vs. $p/p_o$, as predicted by the Stern-Volmer relation (see FIG. 2). The intercept, A, and the slope, B, are determined by least squares fitting to be 0.32±0.01 and 0.70±0.01, respectively, at an ambient temperatures of 23° C. Notice that the sum of A and B is nearly unity.

WIND TUNNEL MEASUREMENTS

I. Tests at NASA-AMES

In order to prove the feasibility of the basic pressure-measuring method employing a single phosphor of type A, PtOEP, under actual operating conditions, wind tunnel tests were conducted at NASA-Ames Research Center in Moffett Field, Calif.

Instrumentation

Figure 3:
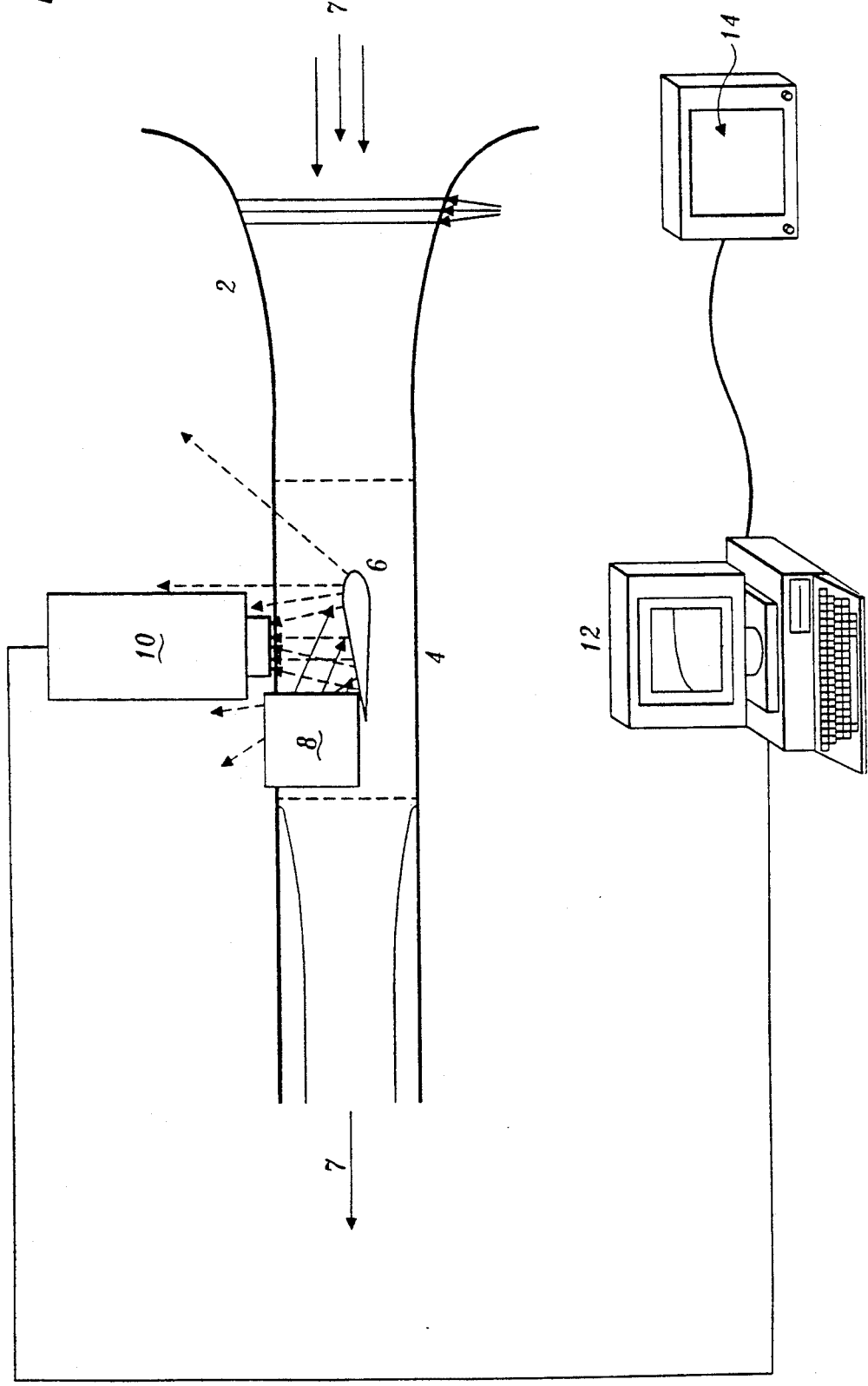
FIG. 3 shows the apparatus used with a subsonic wind tunnel at NASA-Ames.

A schematic of the equipment used in the wind tunnel tests at NASA is shown in FIG. 3. The wind tunnel (2) is an indraft type, capable of reaching wind speeds of Mach number 0.66. The test section (4), with an approximate 18-inch by 18-inch cross section, is made of clear plastic, so that objects may be viewed while undergoing testing. The wing (6) used for the experiment was a NACA-0012 symmetrical airfoil (3 inches in chord and 10 inches in span). A single row of 16 pressure orifices was located across the chord of the wing in the center of the span. When installed in the test section, the wing was fixed at a five degree angle of attack. The entire airfoil was first spray painted with a commercial white epoxy based paint, then spray painted with the PtOEP/silicone resin solution. A positive pressure was applied through tubing connected to the pressure orifices during the painting process so as not to plug the orifices with paint. Air (7) enters the test section for the right-hand side of FIG. 3 and moves to the left-hand side where it exits.

The airfoil in the test section was illuminated from the side, approximately 6 inches from the closest end of the wing. Top illumination was impossible, because the top plastic cover did not pass ultraviolet light. The light source (8) was an Electro-lite Corporation, Model ELC-250 UV lamp. The lamp had its own filter that passed light with wavelengths below 400 nm. The same RCA vidicon camera (10) used for a calibration of the porphyrin was used for this experiment. The camera was mounted outside and above the test section, and directly over the airfoil. A 50 nm bandpass interference filter, centered at 650 nm, covered the camera lens. The distance between the airfoil surface and the camera lens was approximately 10 to 12 inches. The TARGA 8 system in the IBM AT computer (12) accessed the data and stored it in a digitized form. A Panasonic black and white monitor (14) displayed both live and digitized images taken by the TARGA 8 frame buffer system.

The controlling software package for the TARGA-8 board was again modified for this experiment to allow averaging of pixel data across a chord of the wing. One hundred frames of data were taken for each of five adjacent rows of pixels. The five rows were then added vertically to produce a single horizontal row of data. Each discrete pixel location thus contained the resulting summation of 500 gray level values. Data was taken for a dark noise reading, a wind-off condition, and a wind-on condition. The dark noise values were subtracted from both the wind-off and the wind-on conditions. The resulting wind-off intensity data, $I_o$, was divided by the resulting wind-on intensity data, I. By this method, $I_o/I$ values at each pixel location along the chord were determined and a plot of $I_o/I$ versus pixel number (or chord length) was achieved.

Conventional pressure measurements were made by monitoring dual transducer, 24 port each, Scanivalves. Like the intensity information, the pressure data was time-averaged. Approximately 1500 data points were taken over a two-second period. The pressure data was recorded and stored in a Digital Equipment Microvax II.

Results

To make a comparison of pressure ratios determined from luminescence intensity data to those measured directly by pressure taps, least squares linear coefficients, C and D, that best fit directly measured values, $p/p_o$, are defined:

$$p/p_o = C + D(i_o/I) \tag{5}$$

In the following discussion, $p/p_o$ will represent a directly measured pressure ratio, and $p'/p_o'$ will represent a pressure ratio determined from luminescence data using the above Equation.

Figure 6:
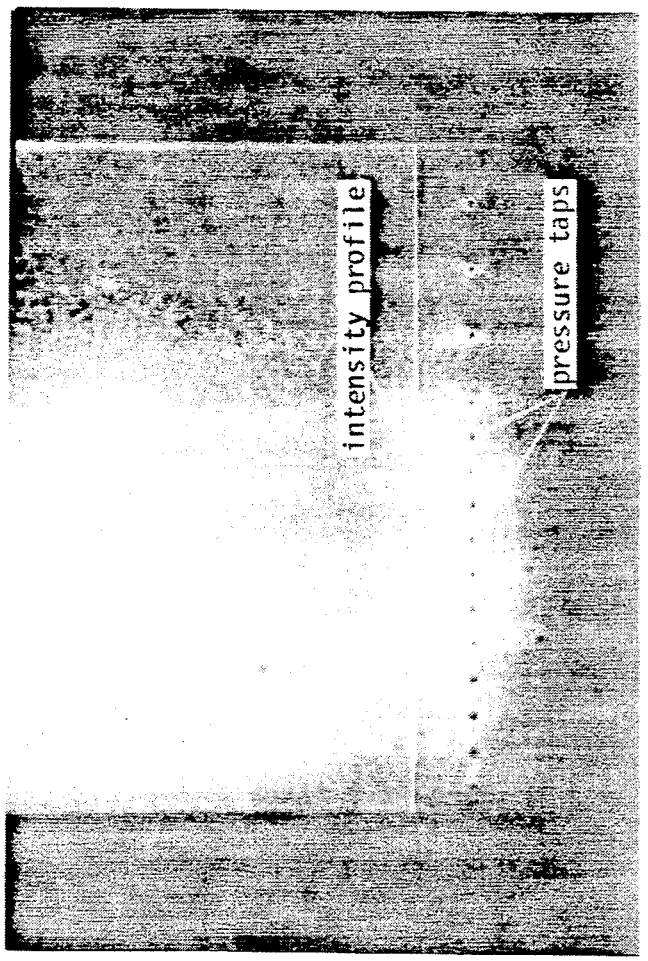
FIG. 6 shows the NACA-0012 airfoil taken at a wind speed of M=0.36. Locations of pressure taps and intensity profile are indicated.
Figure 7:
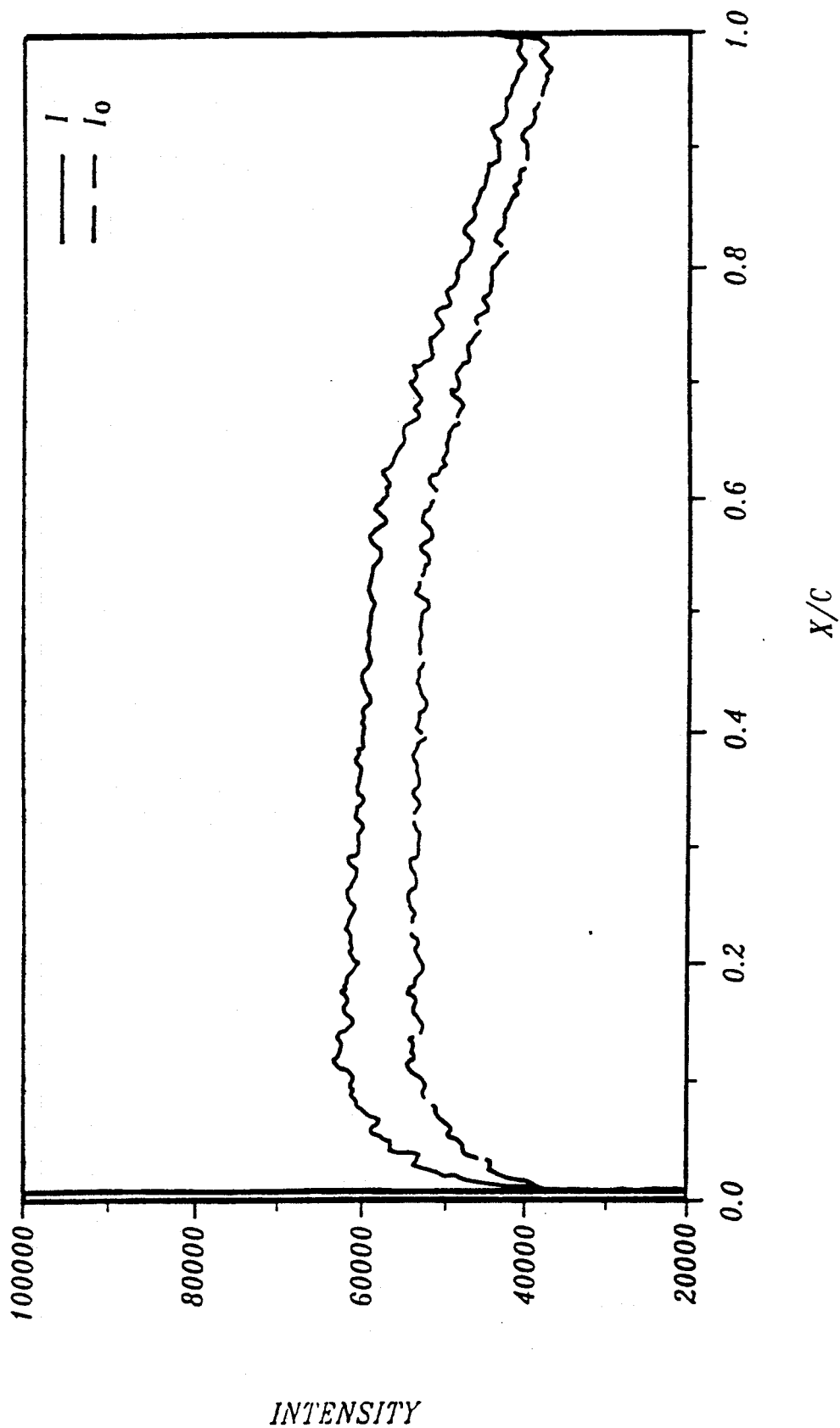
FIG. 7 shows intensity data profiles across the chord of the wing as extracted from FIG. 6 with the wind on (I), and reference data as extracted with the wind off ($I_o$), at the same location.

During the wind tunnel tests, the Mach number, M, was varied over the range of 0.30 to 0.66. FIG. 6 shows a photograph of a portion of the wing taken at a wind speed of M=0.36. One arrow points to the row of pressure taps, and one points to the location, parallel to the pressure taps, where the luminescence data was taken. Intensity profiles measured across the chord of the wind at the position indicated in FIG. 6 are shown for I and $I_o$ images in FIG. 7.

Figure 8:
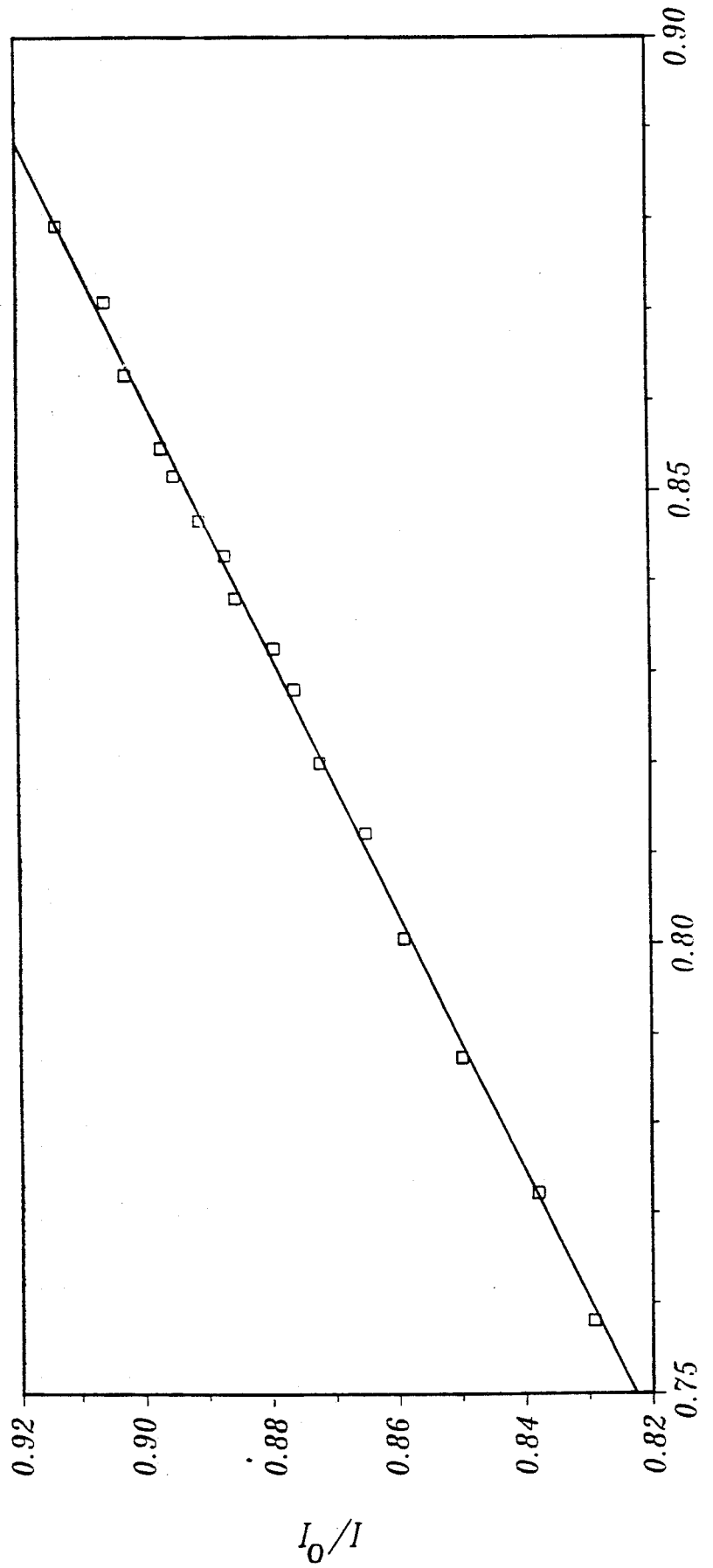
FIG. 8 shows an in situ calibration curve showing $I_o/I$ vs. $p/p_o$ at M=0.36.
Figure 9:
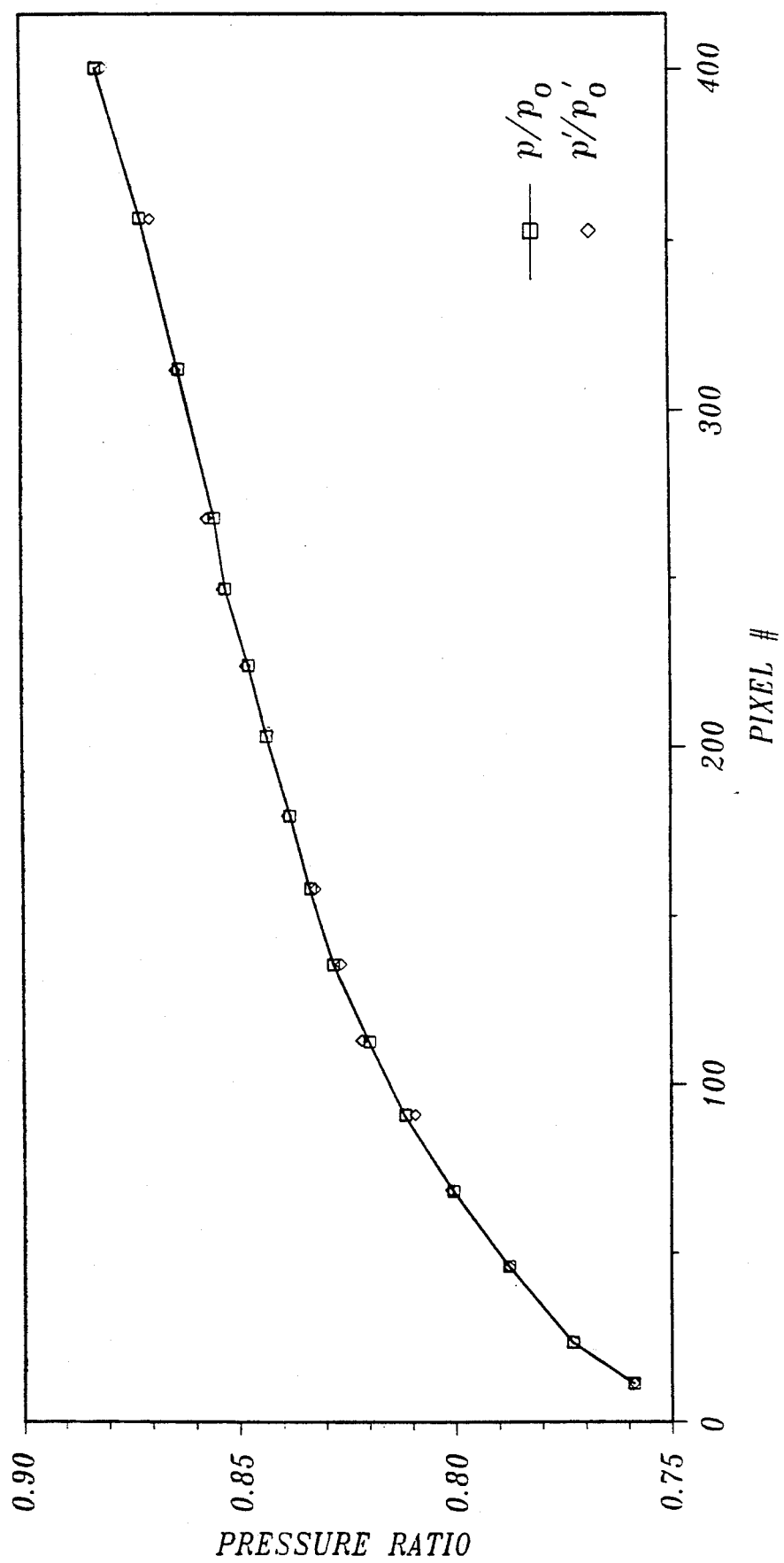
FIG. 9 shows a comparison of actual ($p/p_o$) and predicted ($p'/p_o'$) pressure ratios for M=0.36.

FIG. 8 shows a wind tunnel calibration curve at M=0.36, prepared from pressure ratio information taken from the pressure transducers connected to the wing and the intensity ratio data taken by the camera. The intercept and the slope for the line are 0.30 and 0.70, respectively. These values compare well to the values of a laboratory calibration curve. By reversing the axes, and taking $I_o/I$ to be the independent variable and $p/p_o$ to be the dependent variable, values for C and D are calculated. From these numbers, a $p',p_o'$ value is calculated for each $I_o/I$. The actual pressure ratios $(p/p_o)$ and predicted pressure ratios $(p'/p_o')$ are plotted as a function of chord length across the airfoil, as shown in FIG. 9. As can be seen, the actual and predicted values compare quite favorably.

Figure 10:
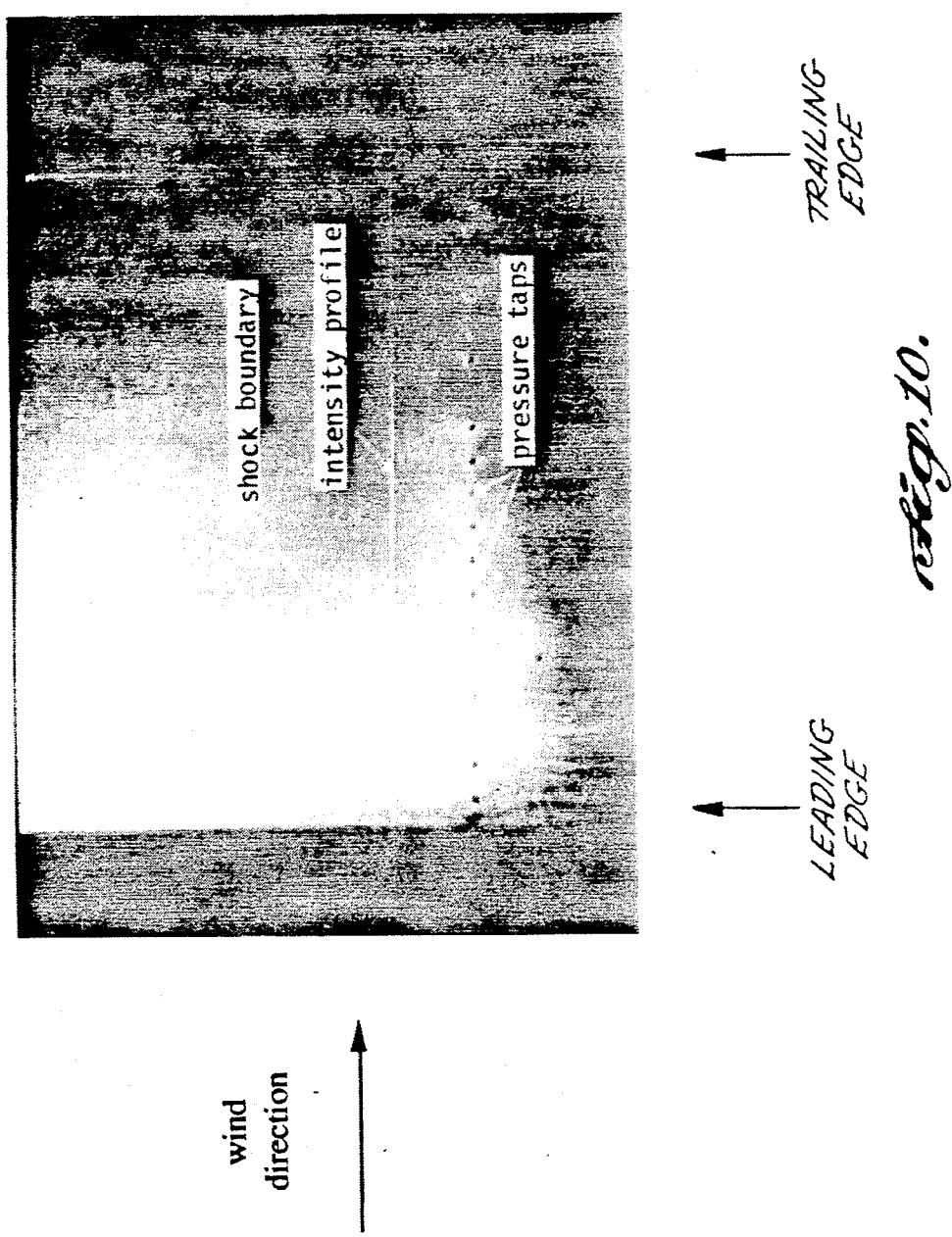
FIG. 10 shows the NACA-0012 airfoil taken at a wind speed of M=0.66. Locations of pressure taps and intensity profile are indicated. The shock boundary is also shown.
Figure 11:
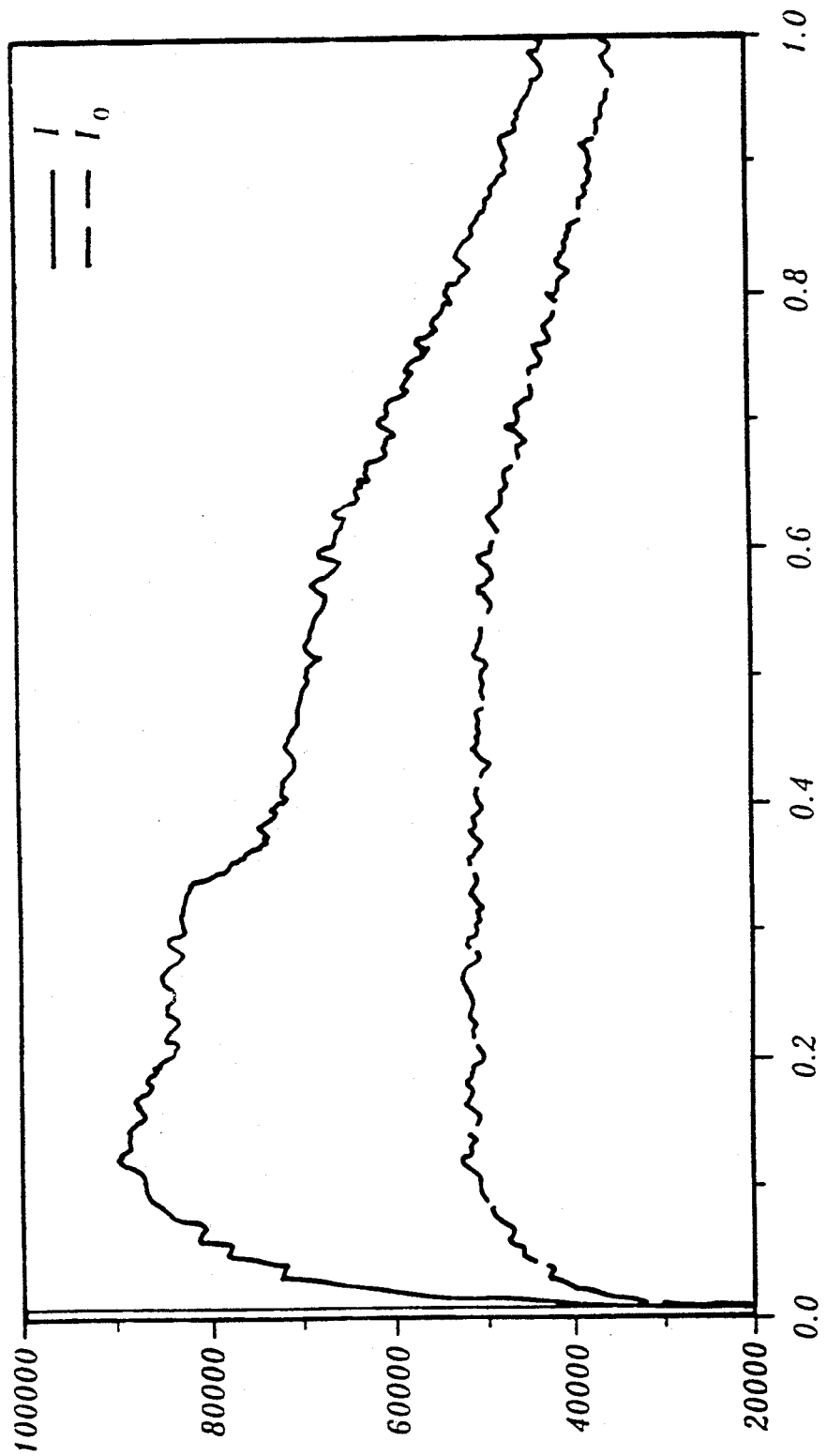
FIG. 11 shows intensity data profiles across the chord of the wing as extracted from FIG. 10 with the wind on (I), and reference data as extracted with the wind off ($I_o$), at the same location.
Figure 12:
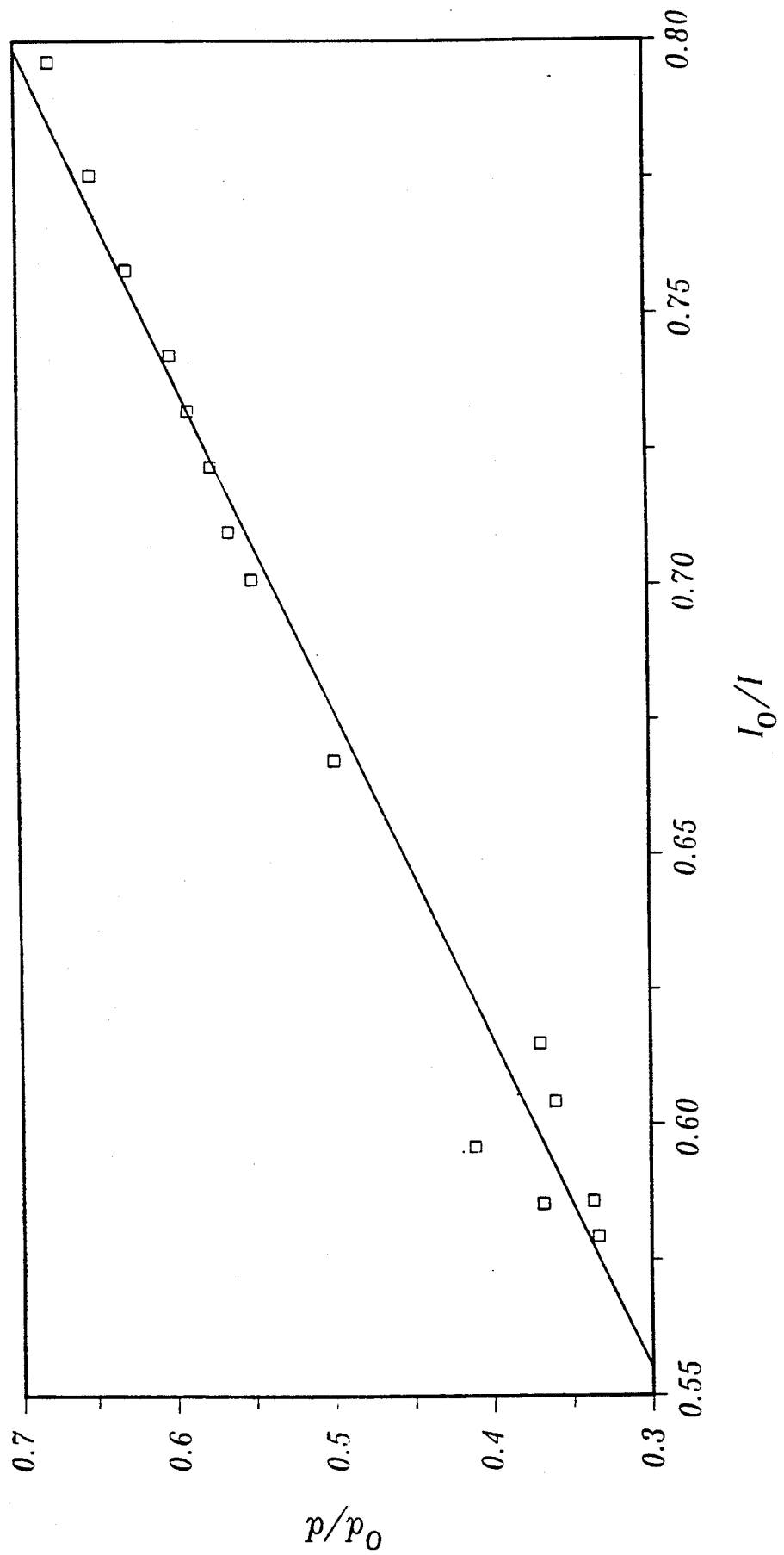
FIG. 12 shows an in situ calibration curve showing $p/p_o$ vs. $I_oI$ at M=0.66.
Figure 13:
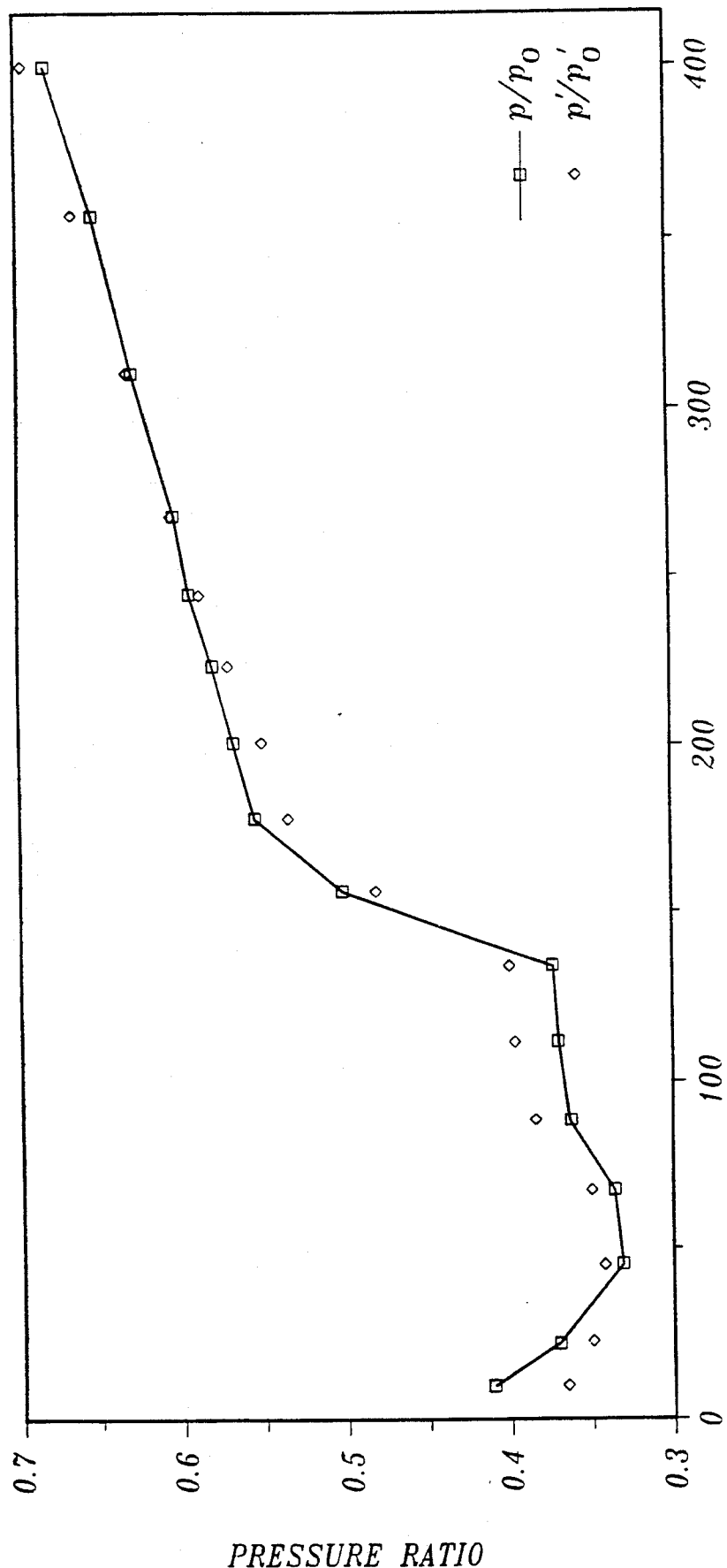
FIG. 13 shows a comparison of actual ($p/p_o$) and predicted ($p'/p_o'$) pressure ratio for a single linear fit at M=0.66.
Figure 14:
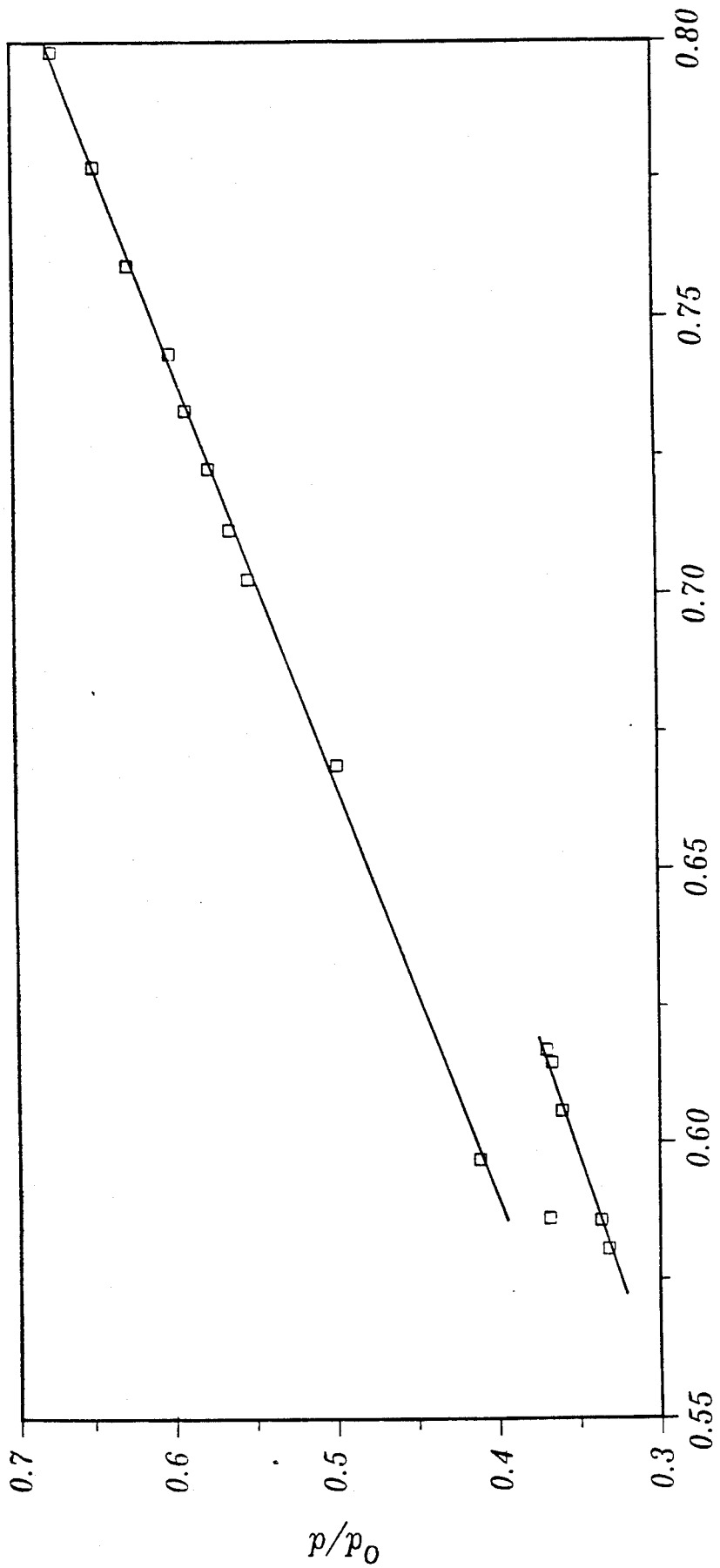
FIG. 14 shows a dual calibration curve of $p/p_o$ vs. $I_o/I$ for M=0.66, representing best fits for variations in temperature of data under the shock wave and elsewhere on the airfoil. The lower line is data from the leading edge; the upper line is data from the trailing edge.
Figure 15:
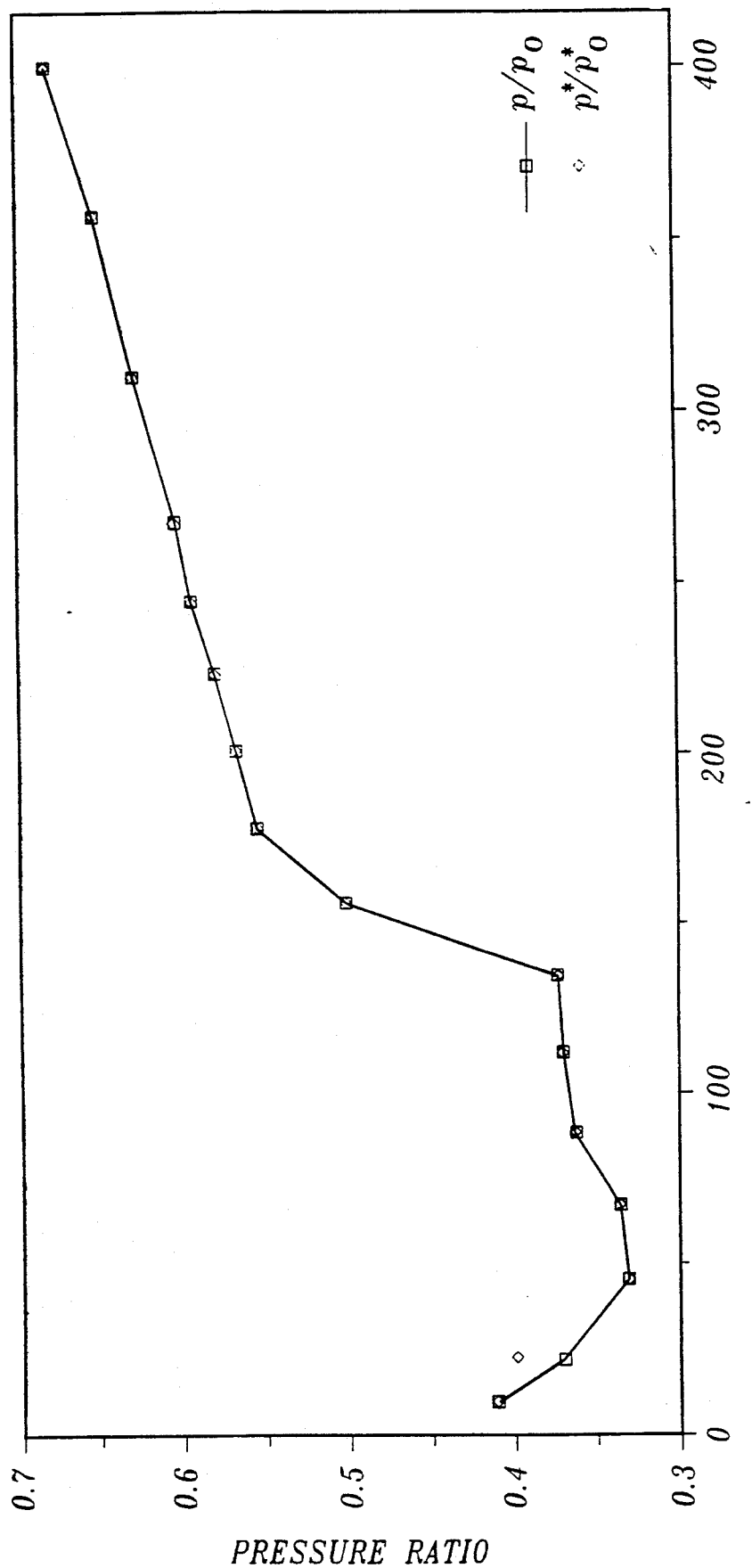
FIG. 15 shows a comparison of actual ($p/p_o$) and predicated ($p^*/p_o^*$) pressure ratios for a dual linear fit, representing two different temperature regions on the airfoil at M=0.66.

At a Mach number of 0.66 and an attack angle of 5°, a shock wave develops on the leading edge of the NACA-0012 airfoil. During testing, a shock wave appeared as a bright band stretching the entire space of the airfoil. The shock wave on the wing can be seen in the raw luminescence image of FIG. 10. The corresponding luminescence profile are shown in FIG. 11. The intensity of the PtOEP phosphorescence is greater at the shock wave, because the oxygen partial pressure is less in this area. FIG. 12 shows a calibration curve for $p/p_o$ versus $I_o/I$ for M=0.66. The solid line shows the best linear fit. The large gap between the two sets of data points corresponds to the significant static pressure difference on either side of the shock boundary. The linear correlation of this data is poorer than that of the data for M=0.36. FIG. 13 shows actual pressure data and pressure data predicted from the calibration curve $(p'/p_o')$. On the upwind side of the shock boundary, the luminescence predictions are systematically high, while on the downwind side the predictions are systematically low. This suggests that two calibration curves to be used, one for the lower pressure region and one for the higher pressure region. If the pressure ratio information for the trailing edge of the airfoil are fit to a separate line than the pressure ratio data for the leading edge (FIG. 14), a much better correlation to actual data results (FIG. 15). In FIG. 15, $p^*/p_o^*$ refers to the data predicted by a dual linear fit.

Figure 16:
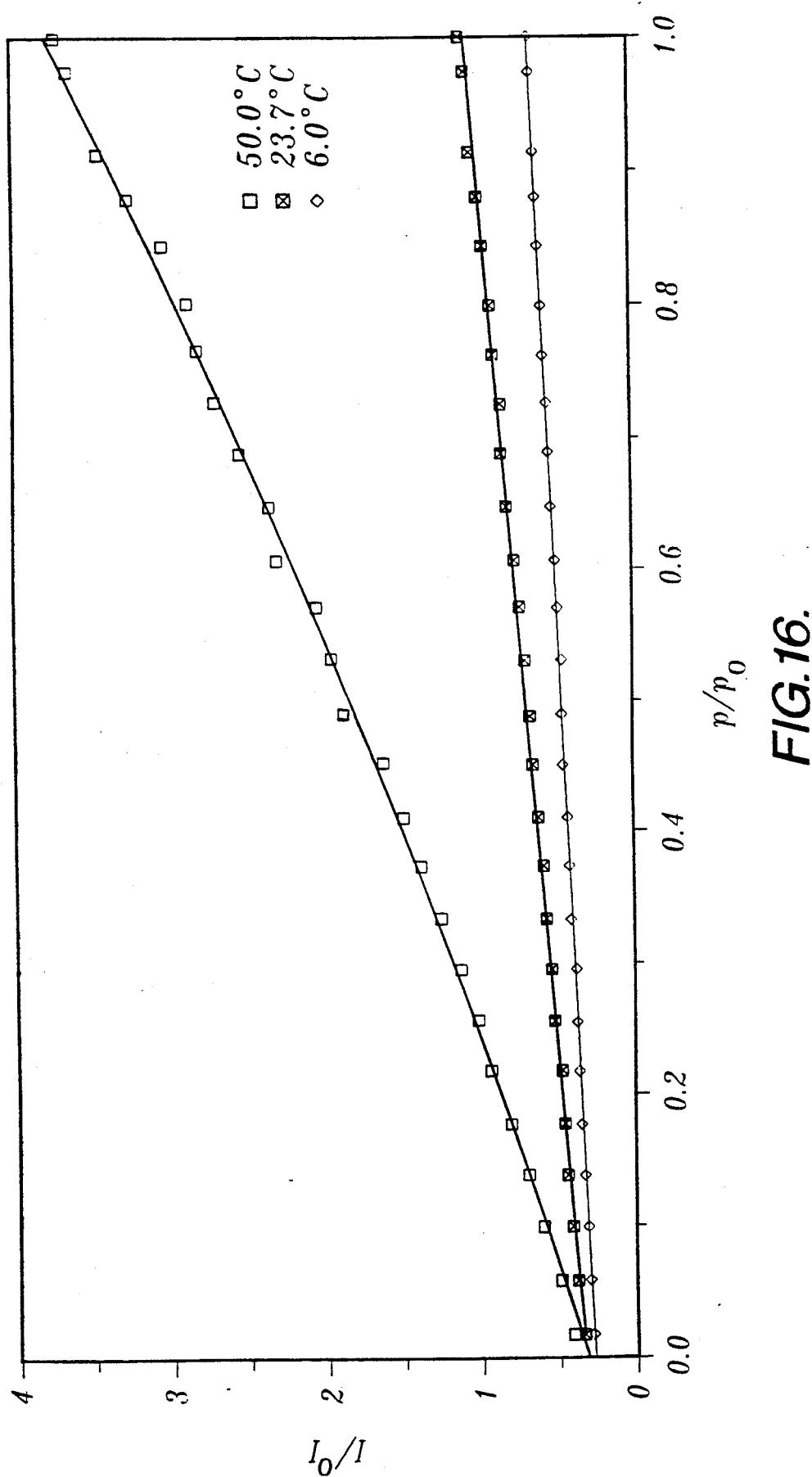
FIG. 16 shows calibration curves for 6.0° C., 23.7° C., and 50° C. $I_o$ for each curve was measured at 23.7° C.

To compare the variance in the two sets of data, the F ratio is calculated. The F ratio is defined as follows:

$$F = s_1^2/s_2^2, \tag{6}$$

where $s_1^2 > s_2^2$. Here s is the estimated standard deviation. The standard deviation for the dual fits was determined by averaging the standard deviation for the leading and trailing areas and weighting each according to its respective number of degrees of freedom. The F ratio for $p'/p_o'$ $p^*/p_o$ was determined to be greater than 70. A table of F values shows that the random probability of generating a number this large is less than $10^{-4}$. The dual linear fit is therefore justified statistically. The need for a dual fit is attributed to a surface temperature variation across the airfoil during airflow. This temperature variation is more significant at the higher wind speeds. Separate experiments have demonstrated that the slope and intercept of the Stern-Volmer plot are temperature dependent for PtOEP. For example, three plots of $I_o/I$ versus $p/p_o$, made at three different temperatures, 6.0° C., and 50.0° C., 23.7° C., are displayed in FIG. 16. Pressures for all three curves ranged from approximately 20 torr to 760 torr. $I_o$ for all three curves was that taken at ambient temperature. The exciting light was blocked between readings to prevent degradation of the film. As would be expected for a molecule whose major dependence on temperature is the rate of oxygen quenching, the intercepts of the lines (where oxygen concentration is 0) remained nearly the same, while the slopes changed significantly. At higher wind speeds, the use of the dual linear fit greatly improves the correspondence between pressures measured directly, and those determined from luminescence intensity data.

In the NASA experiment, ambient room temperature in the wind tunnel was approximately 65° F. During airflow, however, the temperature of the air in the test section dropped to between 50° F. and 60° F. Therefore, $I_o$ and I were not measured at the same temperature. During previous calibration runs in the inventors' laboratory, the $I_o$ and I data were taken at the same temperature. Ambient temperature in most cases was near 75° F. As mentioned earlier, the surface temperature across the wing itself varied several degrees from leading edge to trailing edge. From the information, it has been determined that, for future testing, it will be important to know the temperature on the surface of the object to accurately predict surface pressure without the use of pressure taps for calibration. Of course, if a sensor of type B as defined herein is also contained in the coating, a dual linear fit would not be necessary; rather, a correction could be made for temperature variation over the entire surface of the coated object by measuring luminescence of sensor B separately and processing the data as described above.

Significant drift in intensity for the $I_o$ data indicated possible variations in the light source and/or photodegradation of the porphyrin material. These conditions combined to cause slight inconsistencies between the directly measured $p/p_o$ values and the $p'/p_o'$ and $p^*/p_o^*$ values determined from luminescence intensity data. Incorporation of a pressure and temperature independent sensor C would help correct for light source drift.

Summary

The results of the work presented above are summarized as follows. Calibration curves of $I_o/I$ vs. $p/p_o$ show a nearly linear relation, as theoretically expected. Thin, smooth, uniform films of PtOEP in a silicone resin matrix can be sprayed onto surfaces whose pressure field is desired. A white surface backing for the film greatly enhances signal-to-noise. Ratioing of "wind-on" images to "wind-off" images is achieved with image processing hardware and software. The entire process is much more flexible and inexpensive when compared to conventional pressure measuring techniques. The resulting pressures determined from $I_{oA}/I_A$ data agree with pressure tap measurements to within one percent, PtOEP will degrade after extended exposure to ultraviolet light. However, a fresh coat of PtOEP may be applied on top of the old film, or the film and paint may be stripped, and a new coat of each applied.

The techniques discussed here produce curves indicative of the surface pressure of an aerodynamic object. These results support the feasibility of pressure-mapping aerodynamic surfaces in wind tunnels using luminescence quenching and image processing techniques.

II. Tests at Boeing

To better understand and prepare for the types of conditions that might be encountered in actual industrial wind tunnel operations, further wind tunnel tests were conducted in a relatively large transonic wind tunnel at the Boeing Company. The Boeing transonic wind tunnel provided access to higher wind speeds and conditions more representative of actual flight than those found in the smaller model wind tunnel at NASA. The tests provided valuable insight to the types of situations that would require special attention in actual routine use.

Instrumentation

Figure 17:
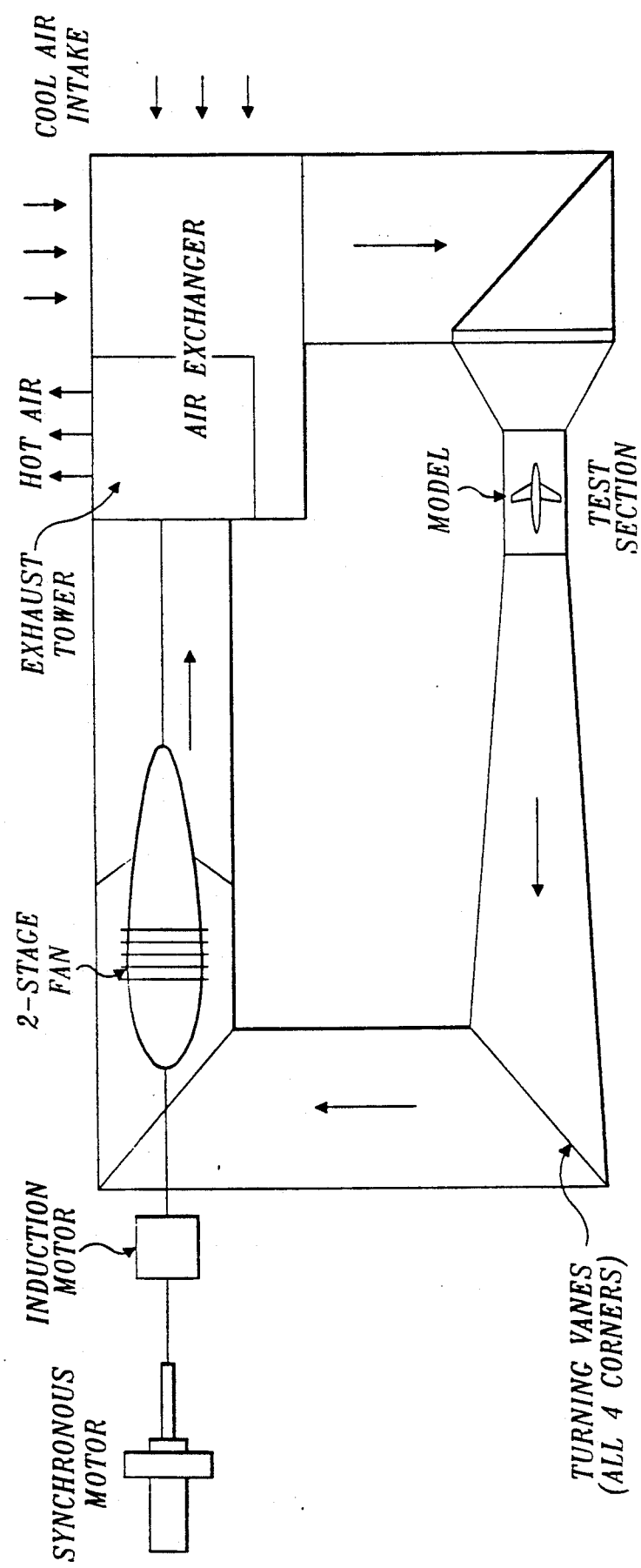
FIG. 17 shows a schematic of Boeing Transonic Wind Tunnel (BTWT). The tunnel is a closed-circuit, single-return system that is vented to the atmosphere at the air exchanger. A cross section of the test section measures 8 by 12 feet.

The Boeing transonic wind tunnel (BTWT) is a closed-circuit single-return system that is vented to the atmosphere (see FIG. 17). The normal continuous-flow operating range is from Mach 0.3 to 1.1. A two-stage fan, powered by a pair of electric motors providing approximately 54,000 horsepower, moves the air in the tunnel. The 8 by 12 foot test section provides the flexibility to test a wide variety of scaled aerodynamic models.

The model initially used for pressure-sensitive paint testing was a Boeing commercial transport half-model, measuring approximately 5 feet from mid-fuselage to wing tip. Half-models are scaled representations of airplanes that have been split on the vertical centerline. Aerodynamicists use half-models, instead of full models, for reasons such as cost efficiency, effective model size enlargement, and instrumentation simplification. Pressure tap readings were collected by electronic pressure scanners to allow for comparison with results obtained from luminescence imaging.

Figure 18:
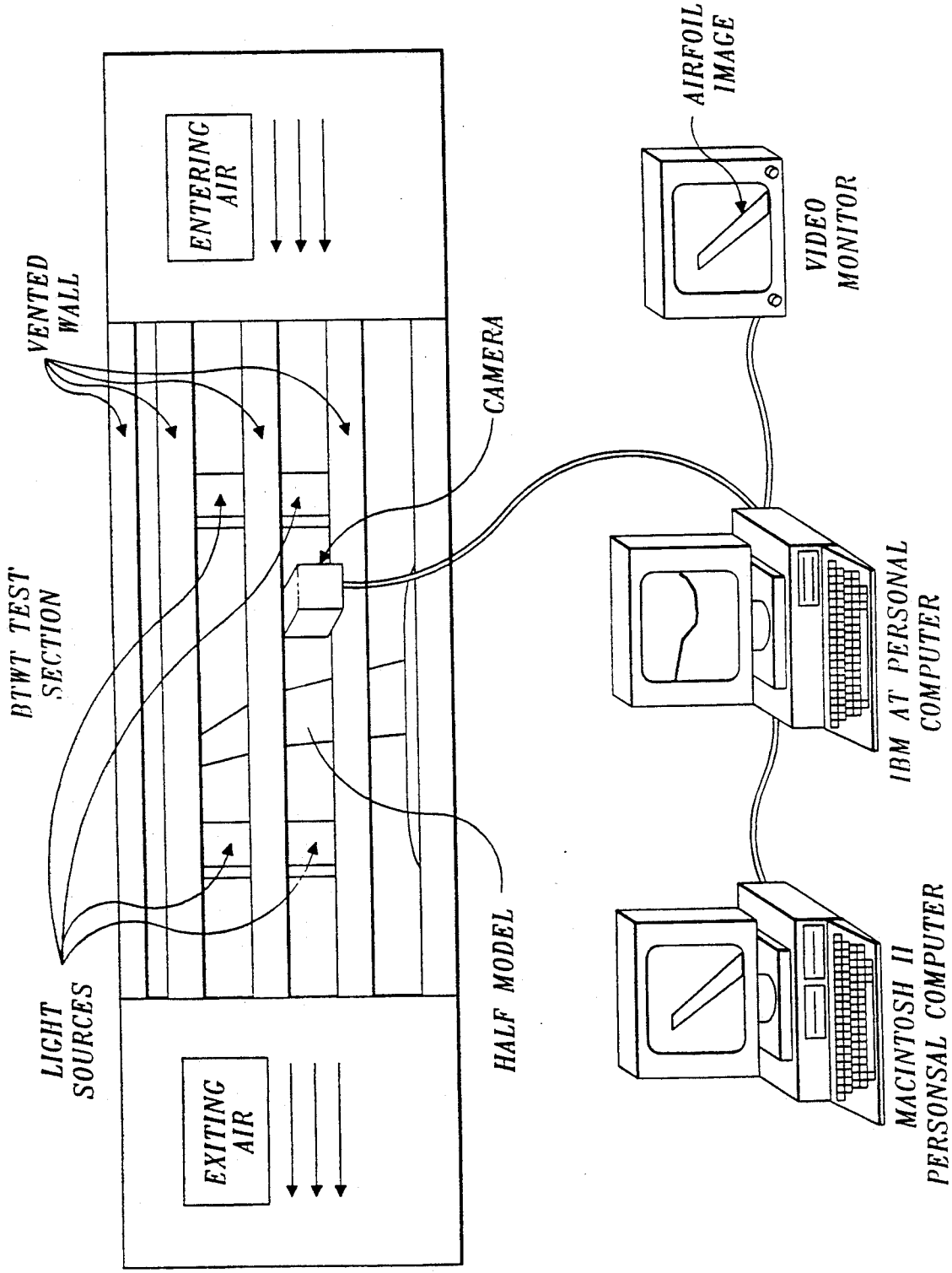
FIG. 18 shows a schematic of a Boeing Transonic Wind Tunnel (BTWT) test section and test apparatus.

The experimental set-up at BTWT is shown in FIG. 18. The same imaging equipment used at NASA-Ames for wind tunnel testing was used for the Boeing tests. The data acquisition system consisted of the RCA vidicon camera, the IBM AT personal computer, and the TARGA-8 frame grabber. In addition, a Macintosh II, equipped with a Data Translation QuickCapture TM frame grabber board and modified Image software for image processing, was employed for experimental use in capturing and displaying full frames of data. A Sony CCD, model XC-57, was also used on an experimental basis to determine its sensitivity to the PtOEP emission under actual wind tunnel operating conditions.

The commercial transport half-model possessed several chords of pressure taps drilled into its surface at several locations across the span of the wing. The camera was adjusted so that the top three rows of pressure taps could be captured within one digitized frame. The actual distance between the rows of pressure taps was approximately eight inches. Approximately 20 inches of the model was visible in one digitized frame. Before installation of the half-model into the wind tunnel, the model's polished steel surface was spray-painted with an industrial white epoxy-based paint. Following positioning in the wind tunnel, and just prior to testing, the half-model spray-painted with the Genesee silicone resin solution containing PtOEP. As with the NACA-0012 model, positive air pressure was applied through pressure tap tubing during the painting process, so as not to plug the orifices with paint.

Inside the tunnel, the half-model was illuminated by four Electro-lite Corporation, Model ELC-250 UV lamps. The filters covering the light sources passed wavelengths between 300 and 400 nm, and also those above 700 nm. All lamps and cameras were securely attached to a vented wall located just inside the wind tunnel test section. Secure attachment to the structure was essential, as the force of moving air at high Mach numbers was strong enough to dislodge loose articles during wind tunnel operation. Cameras were attached via BNC cables to the IBM AT and Macintosh II computers located outside the wind tunnel.

The Image software used on the Macintosh II computer allowed for each acquired frame of data to be summed into a data base, pixel by pixel. The acquisition and summation process for each frame took place in less than one second. Sixty-four full frames of 8-bit data were collected, added together, and stored as 16-bit files. As with the IBM personal computer, individual files were kept for each of the dark noise, the wind-off, and the wind-on situations.

Experimental

The commercial transport half-model, installed in the wind tunnel and coated with the Genesee/PtOEP paint, was ready for luminescence testing. The half-model was draped with a black cloth between tests to reduce photodegradation effects. The Electro-lite lamps were turned on and allowed to warm up prior to testing. After final adjustments had been made, the wind tunnel floor was vacuumed to reduce the number of dirt particles circulating in the tunnel during testing. Impacts from dirt and small debris cause chips in the paint on the leading edge of the model wing. Chips in the paint convert the smooth laminar flow of air over the wing to turbulent airflow, which is undesirable for this testing. The "cap", or the sliding cover that surrounds the vented side walls and ceiling of the tunnel, remained open for access to the cameras.

Just prior to test initiation, the RCA camera lens was covered, and a dark noise reading was taken with the IBM computer. Sixty-four frames of dark noise data were also recorded and stored on the Macintosh II computer. The camera lens cover was then removed, and the sliding wind tunnel "cap" was sealed. All lights in and surrounding the wind tunnel test section were turned off, with the exception of the excitation light sources. Wind-off readings were recorded on both the IBM and Macintosh computers. Ambient temperature in the wind tunnel test section was also recorded.

Following wind-off data acquisition, the wind tunnel was put into operation. During testing, wind speeds ranged from $M_\infty = 0.70$ to $M_\infty = 0.95$. Following stabilization of wind tunnel conditions, wind-on data was recorded on both IBM and the Macintosh computers. Ambient wind tunnel temperature was also recorded. While intensity data was being collected, thermal images of the half-model were also being taken with an Inframetrics infrared camera system. Images taken with the Inframetrics camera were also digitized on the Macintosh II computer and stored for future reference.

When wind-on data acquisition was complete for one run, power to the fans was terminated, and the wind came to a stop. Before the cap was opened, another set of wind-off data was taken with the Macintosh II computer. Ambient temperature was recorded. The cap for the tunnel was then opened enough to allow one person in to cover the camera lens. A set of second dark noise data was recorded on the Macintosh II computer. The second wind-off and dark noise readings were taken due to significant ambient wind tunnel temperature increases during tunnel operation. Temperature increase is attributed to heating of the air by the fans used to propel the wind. Ambient temperature increased from approximately 15° C. to approximately 50° C. inside the tunnel during one test. Consequently, the intensity of the wind-off image taken after the test decreased dramatically from the initial pre-test reading. The decreased porphyrin intensity would require correction to achieve correct pressure information. In addition, the cameras and other equipment attached to the vented walls inside the test section also were heated by the wind during the test. The dark noise of the RCA camera, being temperature dependent, increased significantly between pre-test and post-test readings. Increased dark noise readings produced a smaller dynamic range for the intensity data, and consequently less precision in the quantitative results.

The preceding test procedure was repeated for each Boeing transonic wind tunnel test. Data was recorded both on the IBM/TARGA system and the Macintosh-/QuickCapture TM system for each test.

Results

Here, $p/p_o$ refers to pressure data taken from pressure taps on the model surface, and $p^*/p_o^*$ refers to pressure data predicted from dual fit intensity information.

Figure 19:
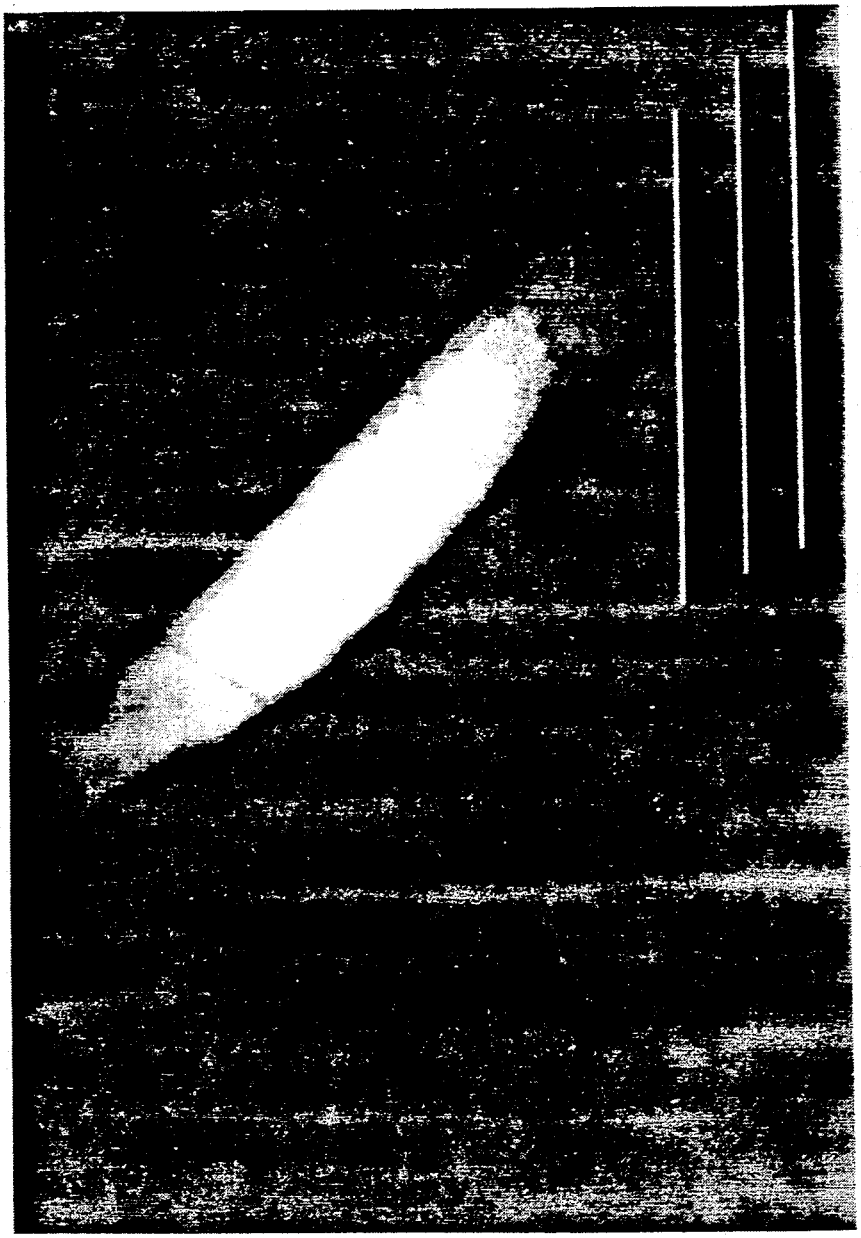
FIG. 19 shows the Boeing commercial transport wing taken at a wind speed of M=0.86. Locations of pressure taps (arrow B) and intensity profiles (arrows A and C) are indicated.

Quantitative data for the Boeing tests was collected on the IBM/TARGA image processing system. The TARGA software in the IBM AT computer was programmed so as to collect 100 points of data at each pixel location in a chord both above and below the desired row of pressure taps. The results consisted of dark noise, wind-off ($I_o$), wind-on (I) and $I_o/I$ information. A digitized raw image, representing the area of the wing from which one set of data was collected, is shown in FIG. 19. The pressure tap row and the locations where intensity data was taken are indicated with arrows. The actual distance between the two rows where intensity data was collected was approximately ten centimeters. The digitized image of the wing was recorded by the Macintosh II and Data Translation frame grabber board. Sixty-four frames of data were collected and averaged for dark noise, wind-off, and wind-on images. Dark noise was subtracted from both wind-off and wind-on data. The resulting images were then ratioed to produce $I_o/I$ data.

Figure 20:
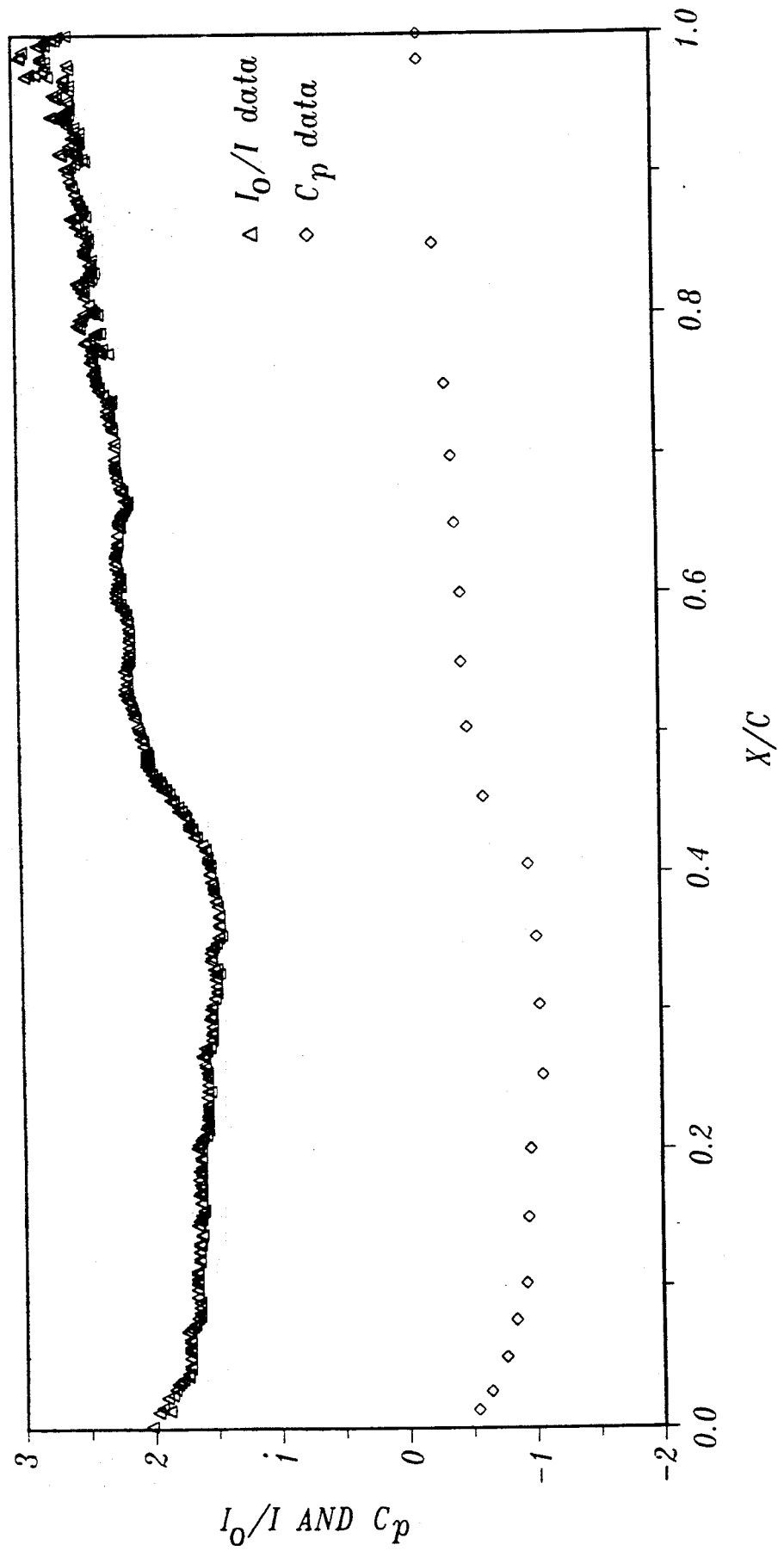
FIG. 20 shows a comparison of $I_o/I$ data and $C_p$ data for alignment purposes.
Figure 21:
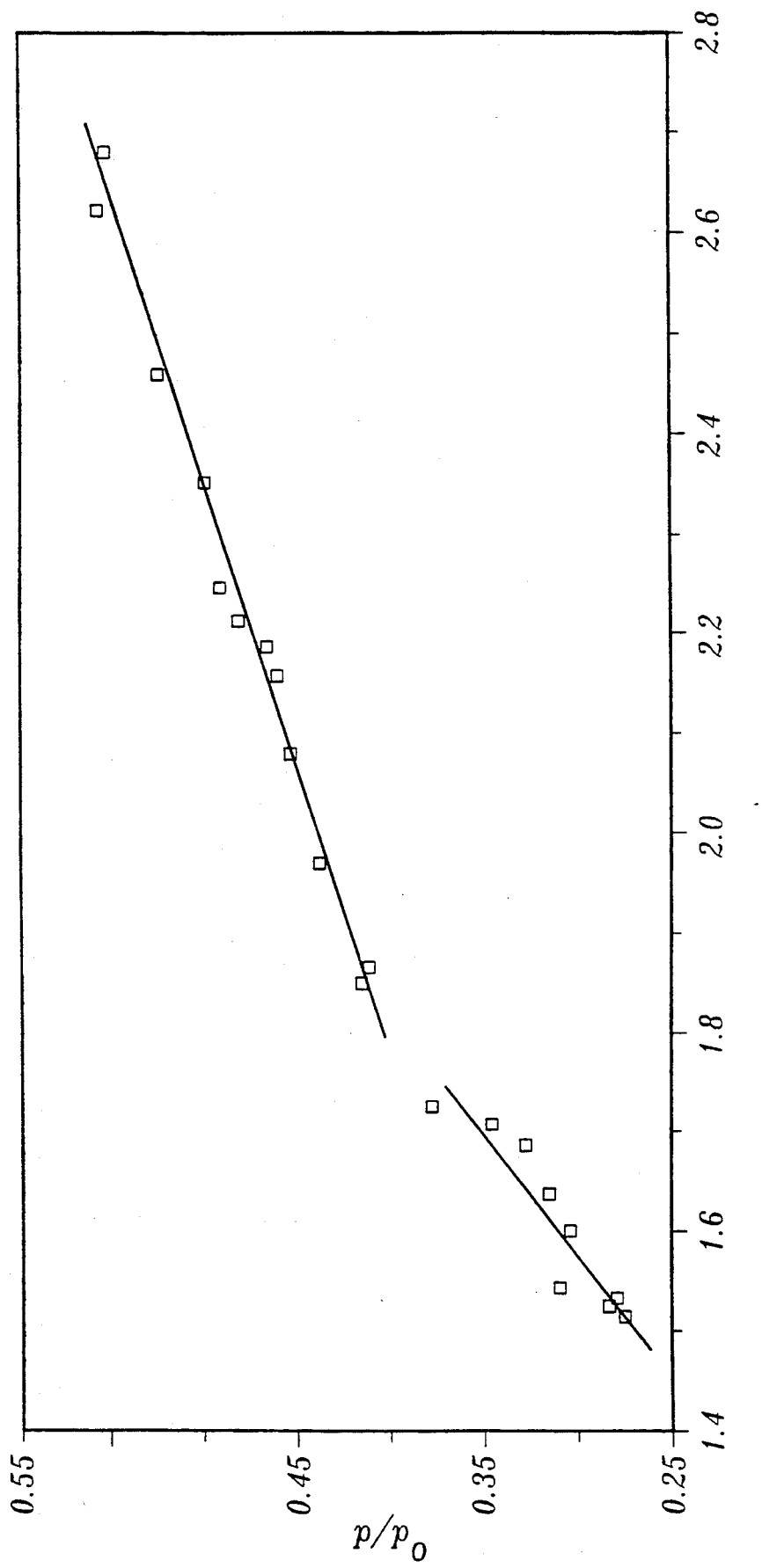
FIG. 21 shows an in situ calibration curve showing $p/p_o$ vs. $I_o/I$ at M=0.86 for data corresponding to lower arrow (C) in FIG. 19.
Figure 22:
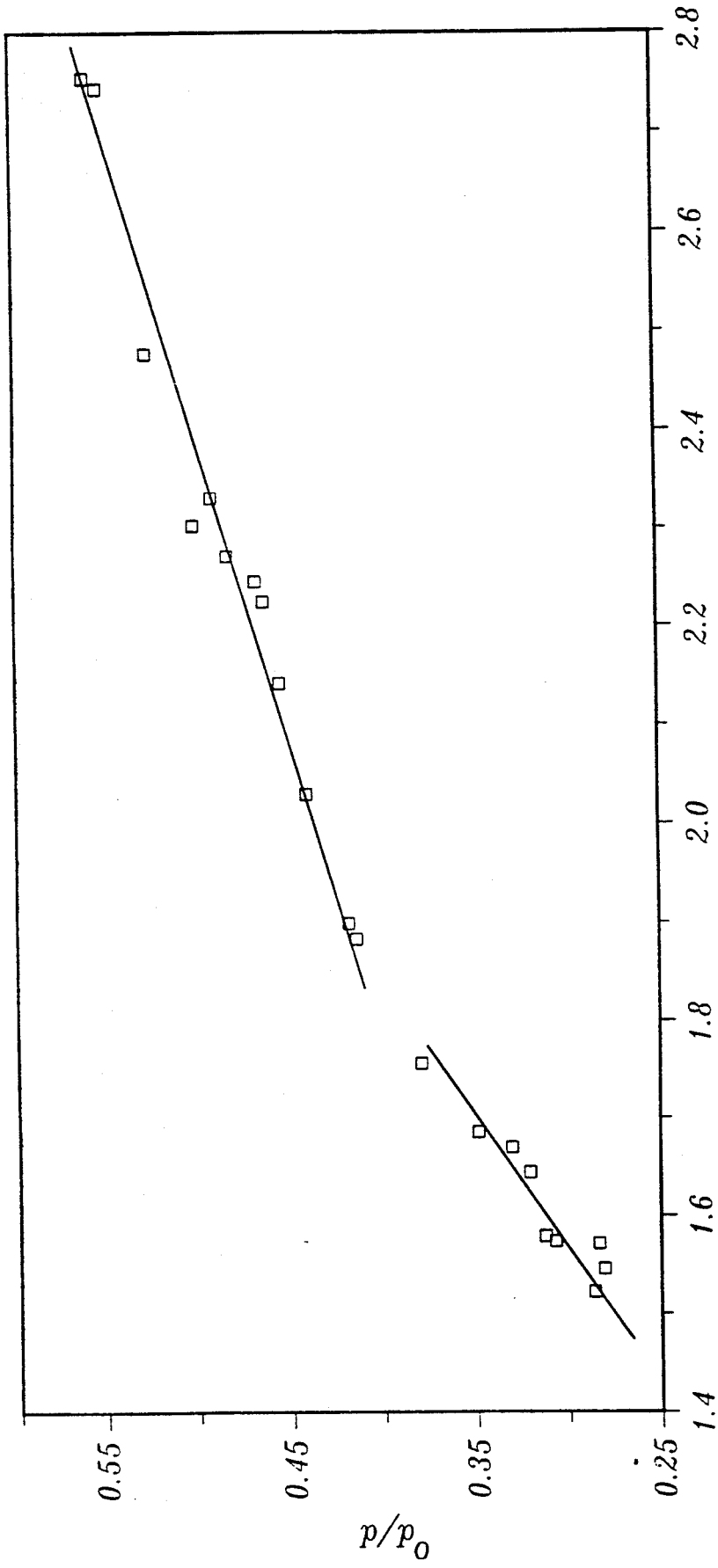
FIG. 22 shows an in situ calibration curve showing $p/p_o$ vs. $I_o/I$ at M=0.86 for data corresponding to upper arrow (A) in FIG. 19.
Figure 23:
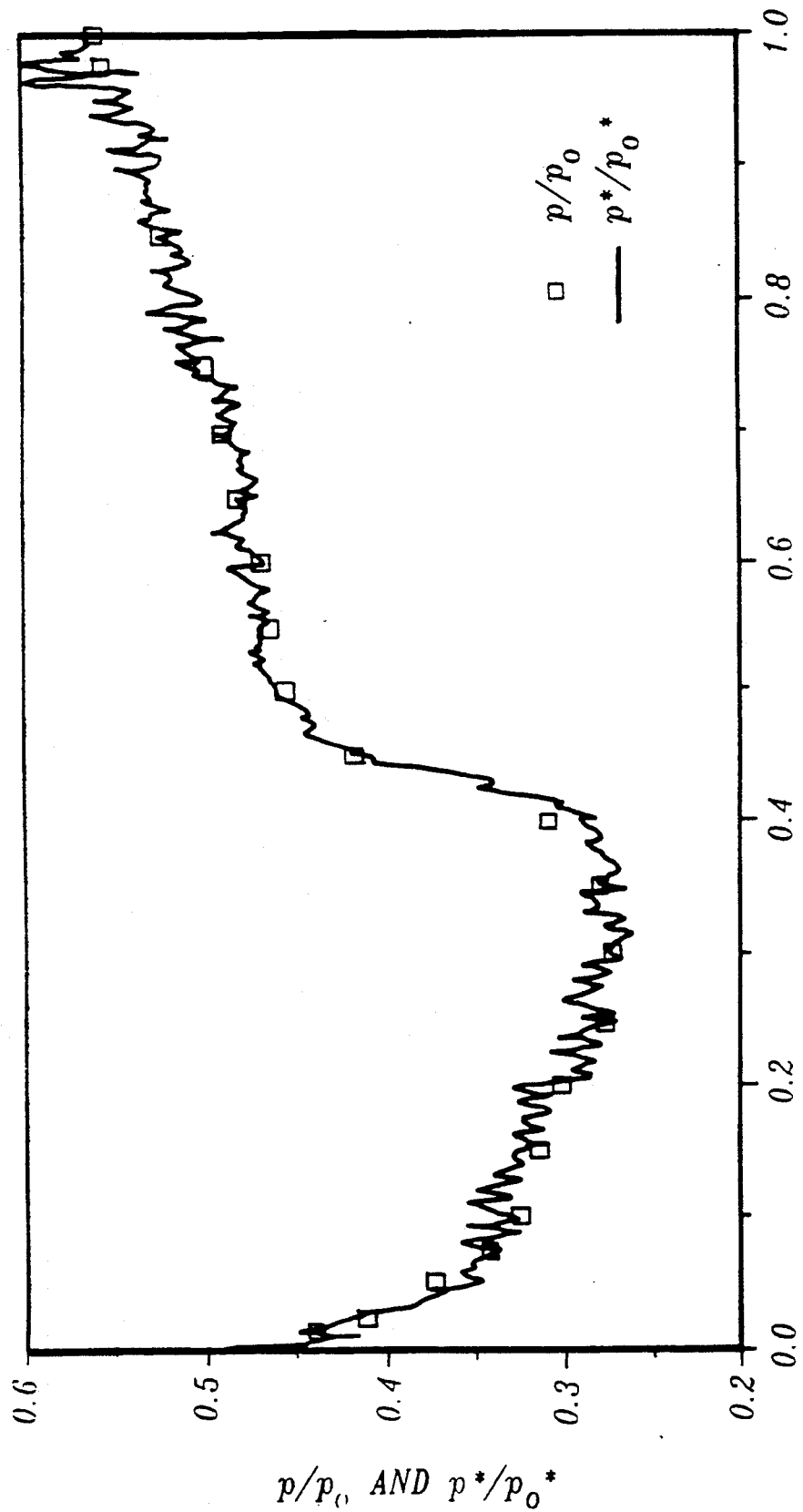
FIG. 23 shows a comparison of actual ($p/p_o$) and predicted ($p^*/p_o^*$) pressure data corresponding to the lower arrow (C) in FIG. 19.
Figure 24:
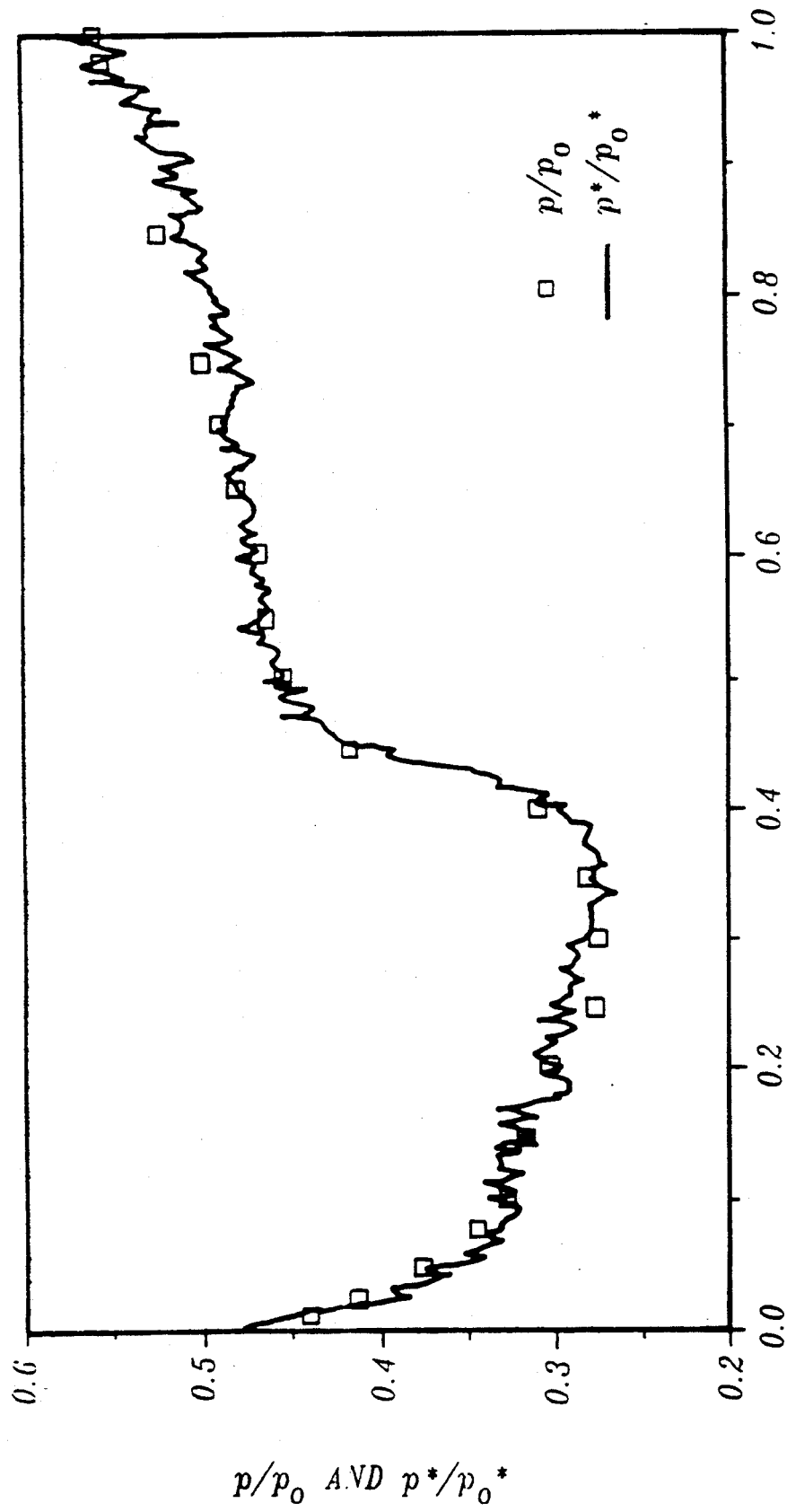
FIG. 24 shows a comparison of actual ($p/p_o$) and predicted ($p^*/p_o^*$) pressure data corresponding to the upper arrow (A) in FIG. 19.
Figure 25:
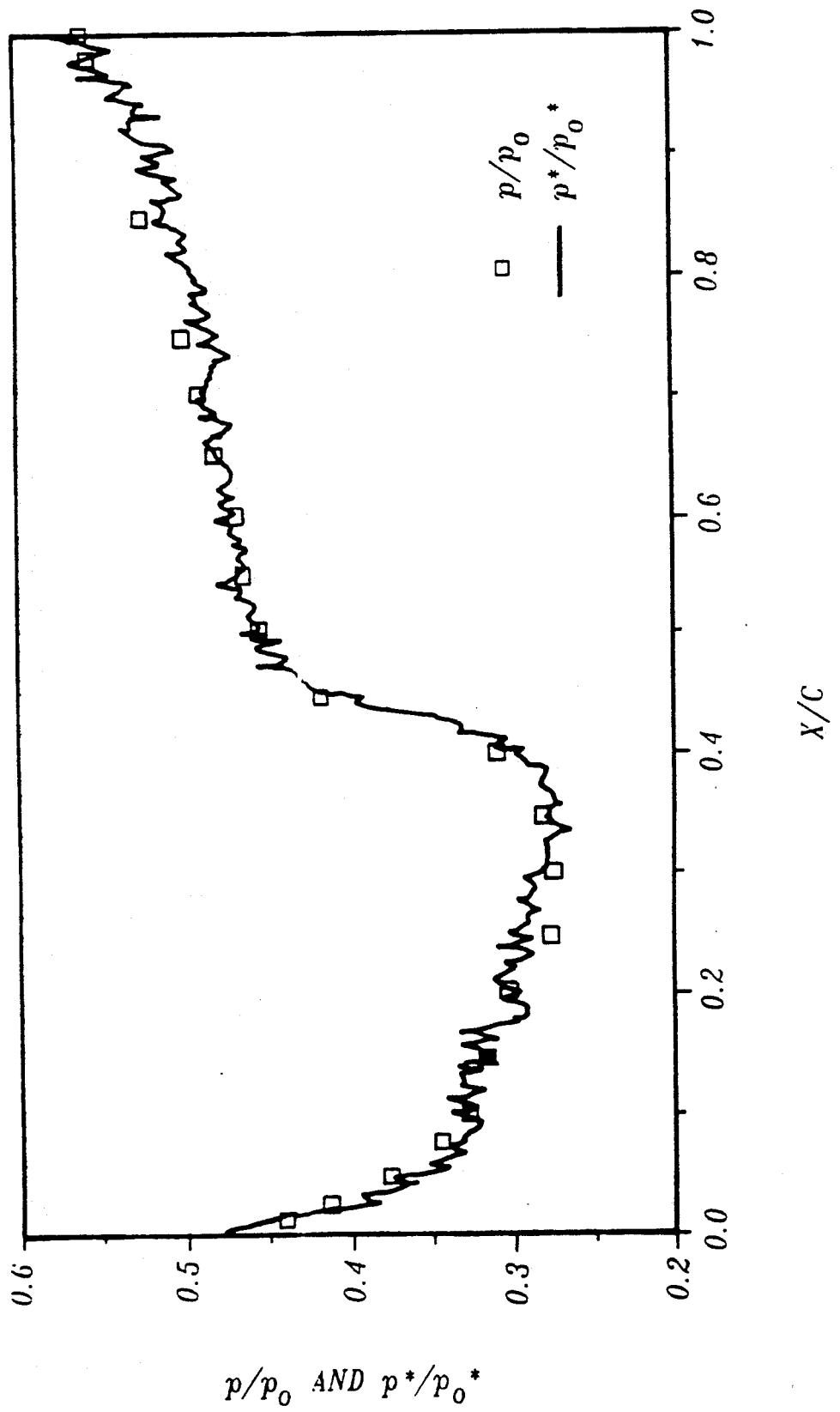
FIG. 25 shows a comparison of actual ($p/p_o$) and predicted ($p^*/p_o^*$) pressure data corresponding to the upper arrow (A) using calibration data from the lower arrow (C) in FIG. 19.

The first step in converting luminescence data to quantitative pressure data was to align the pressure tap information with the intensity data so as to obtain the necessary information for creating calibration curves. Alignment was generally accomplished by plotting $I_o/I$ ratios taken by the IBM system and $C_p$ data, measured from pressure taps, on the same graph. FIG. 20 displays a plot of $C_p$ and $I_o/I$ vs. fraction of chord length. It is readily seen that the two sets of data are directly related and aligned. After converting $C_p$ to $p/p_o$, a calibration curve of $I_o/I$ vs. $p/p_o$ was created. Calibration curves were determined for a wind speed with Mach number 0.86 and an angle of attack of 3 degrees for one pressure tap row. These curves are shown in FIGS. 21 and 22. Notice the similarities in the slopes and intercepts for the two curves. As with the NASA data, the data points for the shock wave and the data for the trailing edge were fit to different curves to account for temperature differences. By the method described above, values for calculated pressure ratios ($p^*/p_o^*$) were then determined from the appropriate calibration curves. FIGS. 23 and 24 compare the calculated pressures ($p^*/p_o^*$) and the measured pressures ($p/p_o$) for the two rows of data taken at a Mach number 0.86 and an angle of attack of 3 degrees. In FIG. 25, the slope and intercepts data for the bottom row of intensity data is used to predict $p^*/p_o^*$ for the top row. The agreement is very good, indicating that, with proper temperature calibration, pressure values over the surface of the wing may be predicted accurately and with good precision using data from limited numbers of pressure tap rows.

Small inconsistencies from pressure tap data do occasionally exist and may have one or more explanations. The most significant one is probably the fact that the shock conditions apparent on the wing are not always stable and actually move back and forth across the chord of the wing to a limited extent. The condition is evident in continuous video recordings of the model in the operating tunnel, and is especially true at high Mach numbers (those above 0.70) and at higher angles of attack (3 to 7 degrees). Averaging of data tends to smooth these unstable flow characteristics. Complete pressure tap data is recorded in less than four seconds, so the shock wave and other pressure conditions may be expected, in some cases, to vary slightly from luminescence data that has been averaged for one minute or more.

Other elements that may cause inconsistencies between pressure tap data and pressure data predicted from intensity information are: 1) camera movement in the wind tunnel; 2) model translation due to high wind conditions; and 3) high temperature effects in the recirculating wind tunnel. Camera movement, caused by vibration of the inner structure during wind-on conditions, may be reduced by mounting the camera to a stable structure not attached directly to the test section floor or walls. Model translation, or moving of the model backwards during airflow, may be corrected during the ratio process. It will be necessary to align the raw $I_o$ and I data before beginning the ratio process. It will probably be helpful to put markers on the model in several locations to align the wind-off and wind-on data. High temperature, resulting from operation of the large tunnel fans, cause a significant decrease in expected wind-on intensity. In some cases, such as the ones shown in this example, wind-on data, while displaying characteristic shock wave information, is actually less intense than wind-off data. $I_o/I$ ratios are therefore greater than unity, as predicted by a high temperature curve. A dark noise reading may be taken following wind tunnel operation to adequately account for increased noise during the wind-on readings.

Figure 26:
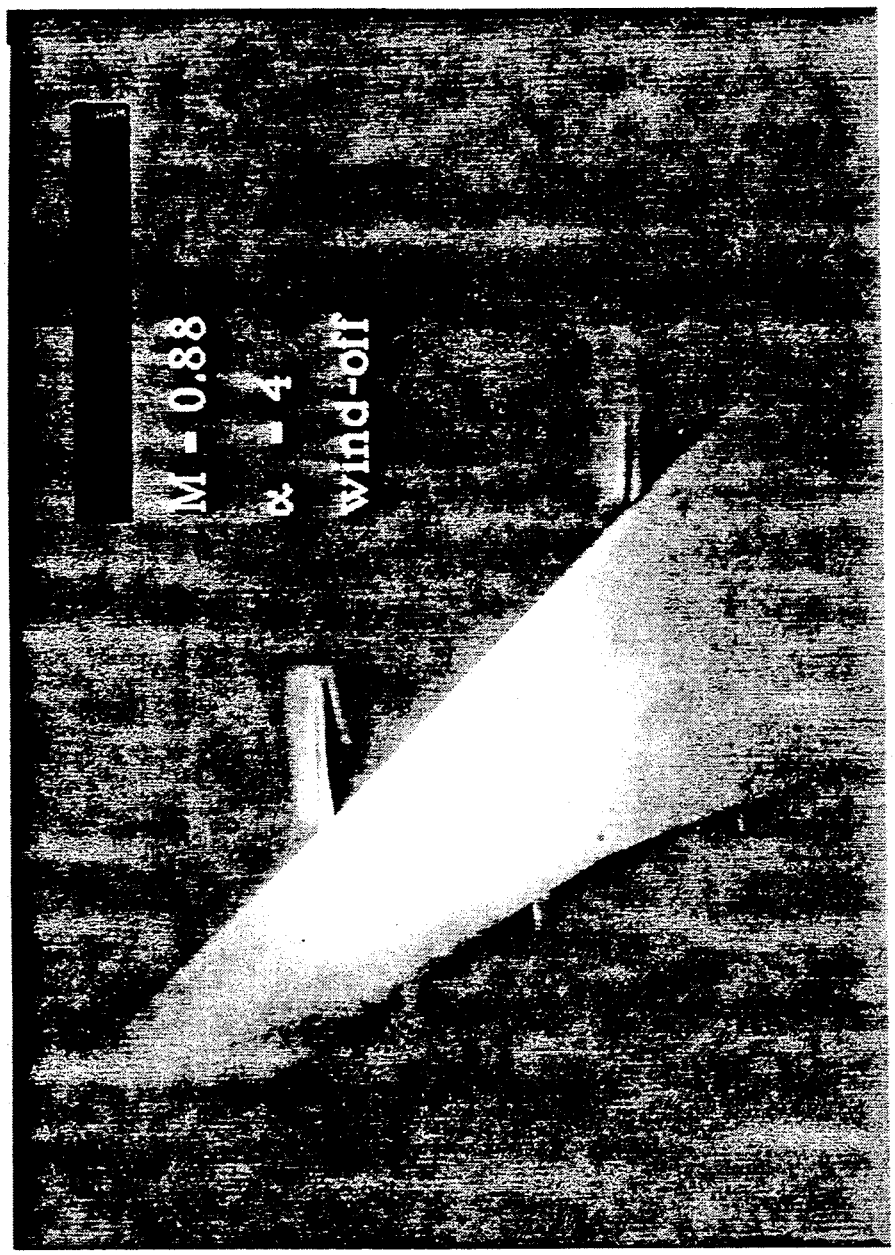
FIG. 26 shows a wide angle view of a Boeing commercial transport wing. The wind speed is zero, and the angle of attack is 4 degrees. Notice the uneven lighting on the surface of the wing.
Figure 27:
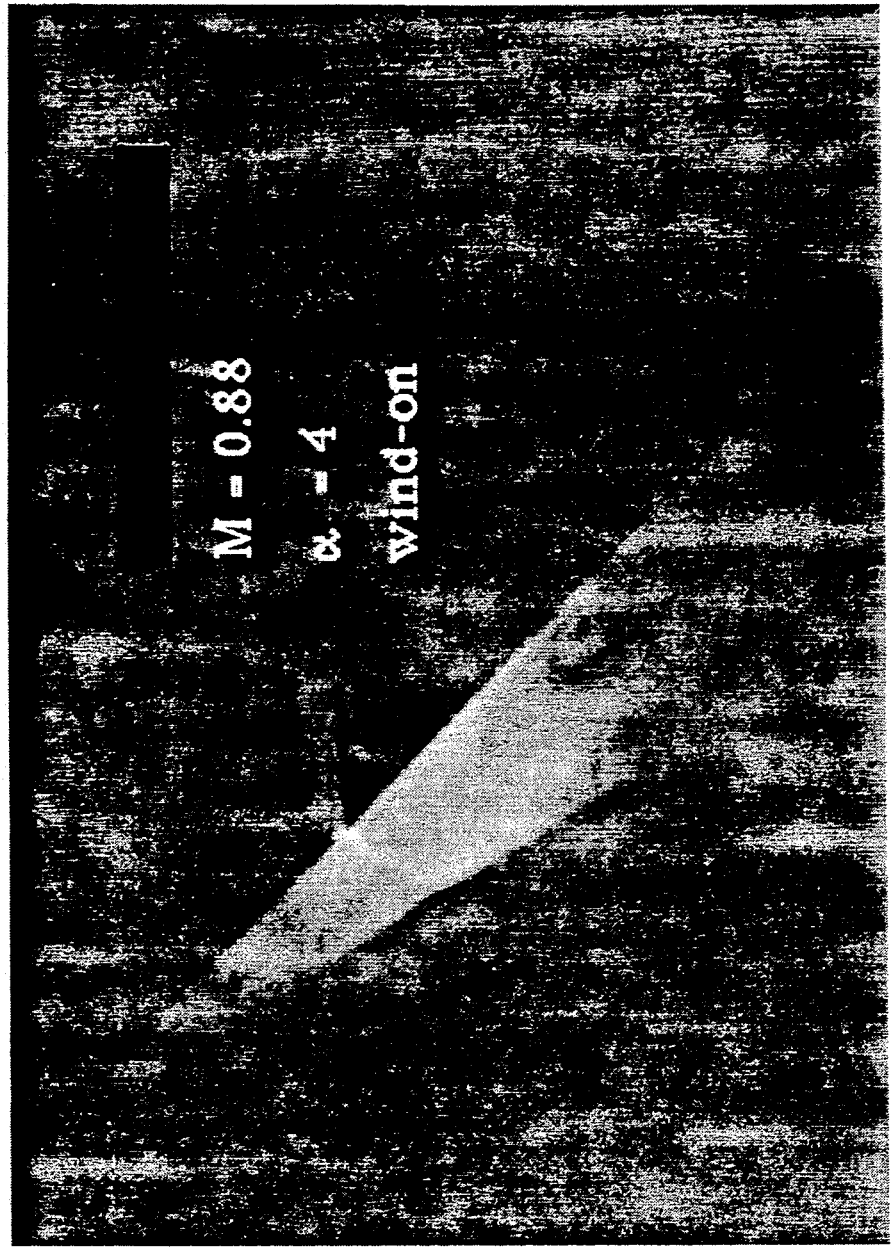
FIG. 27 shows a wide angle view of a Boeing commercial transport wing. The wind speed is M=0.88, and the angle of attack is 4 degrees. Shock patterns have developed, but uneven source lighting is still evident.
Figure 28:
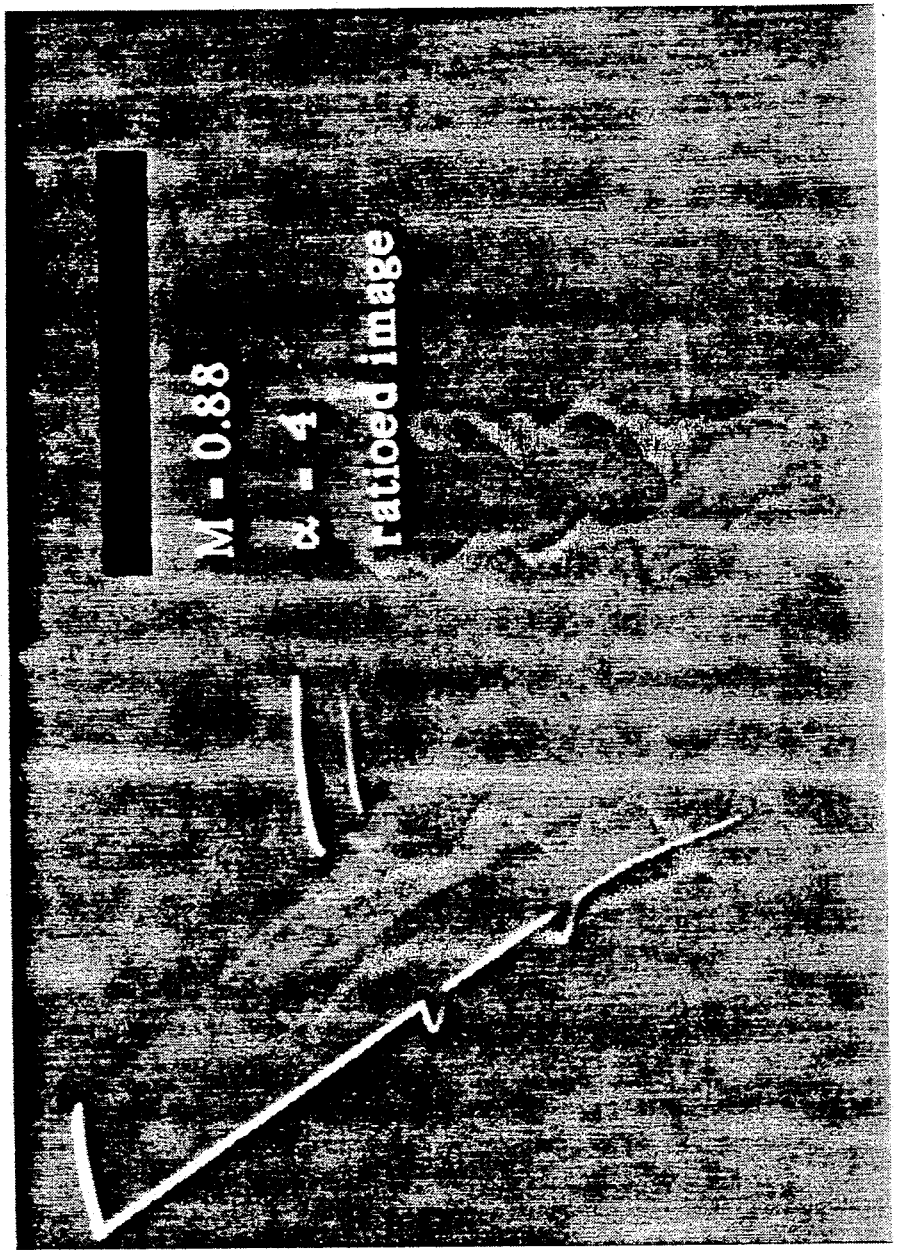
FIG. 28 shows a ratioed image representing a continuous pressure map of a Boeing commercial transport wing. (The image of FIG. 26 has been divided by the image of FIG. 27.) The wind speed is M=0.88, and the angle of attack is 4 degrees. The white edging is due to a small model translation during air flow.
Figure 29:
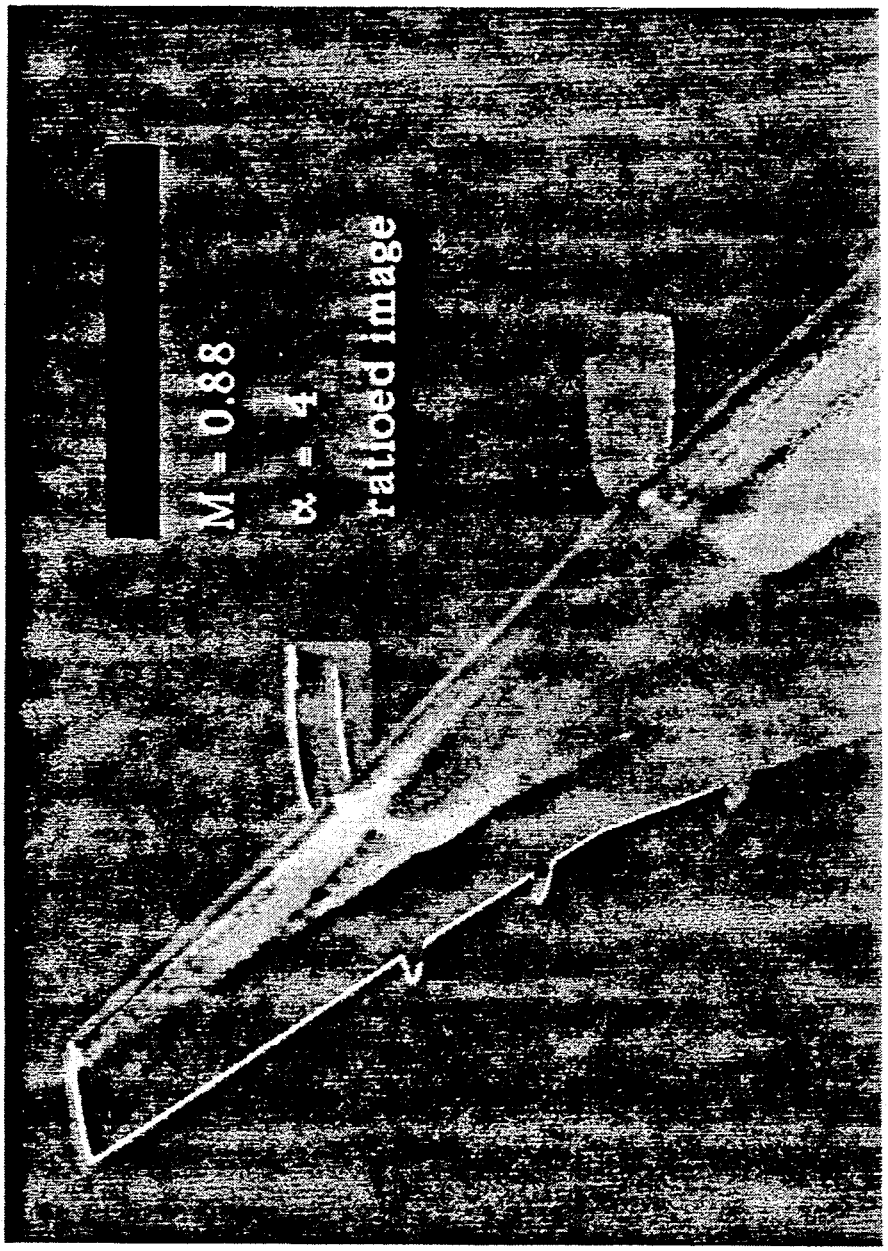
FIG. 29 shows a ratioed image of FIG. 28 to which computerized false color has been added for greater enhancement of the pressure patterns.

Images taken with the Macintosh II also provide valuable qualitative information for aerodynamicists. Interesting pressure patterns, not apparent in wind-on images, become obvious upon the ratioing of wind-off to wind-on images. FIG. 26 displays the wind-off image of a larger Boeing commercial transport wing, taken with an 8 mm wide-angle lens. The wing is at an attack angle of 4 degrees. The two modules attached to the leading edge of the wing (on the right) are nacelles, or engine housings. Local variations in light intensity are readily apparent on the wing's surface. FIG. 27 displays the wing at the same angle of attack, but at a wind speed of $M_\infty = 0.88$. Some pressure information is visible, but the uneven light intensity on the surface masks some of the pressure patterns. FIG. 28 displays a ratioed image of the wing. Here, the uneven light pattern is completely removed, and the resulting visible patterns represent the true pressure effects. (The white band surrounding part of the upper and trailing edge portion of the wing is due to model translation, which was discussed above.) In FIG. 29, false color has been added by the computer to enhance the pressure patterns. Much of the information in this image had never before been accessible with conventional flow visualization methods.

Figure 30:
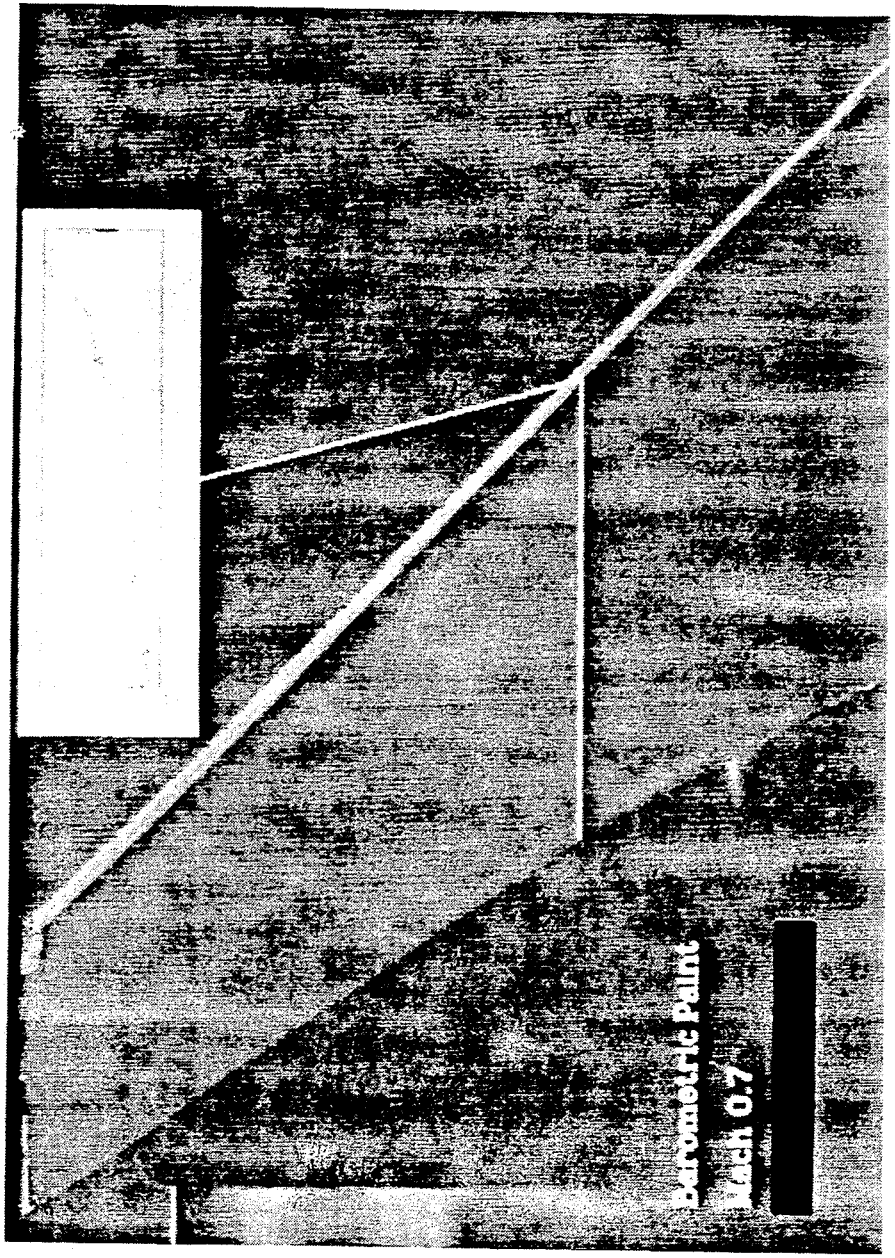
FIG. 30 shows a Boeing commercial transport wing taken at a wind speed of M=0.70. The plot in the upper right corner represents luminescence intensity.
Figure 31:
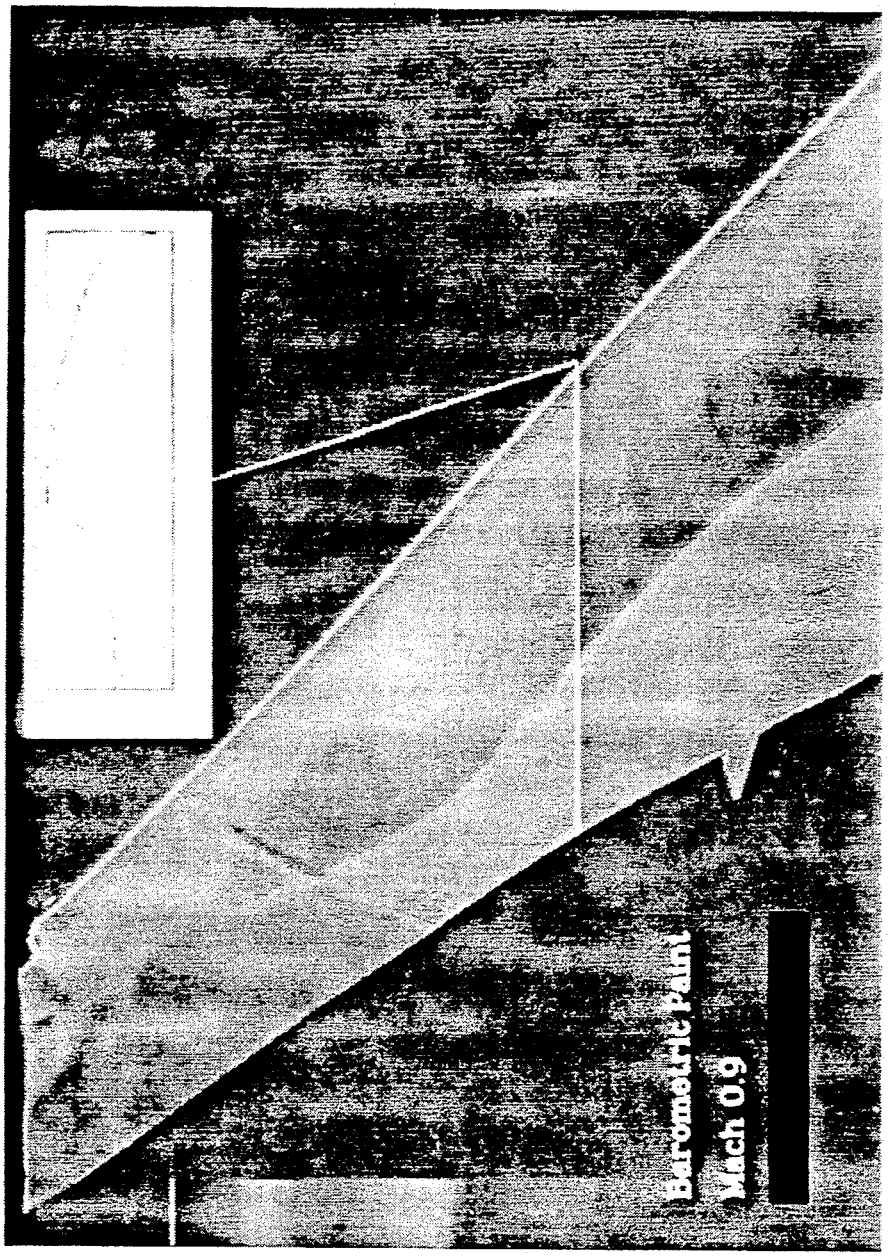
FIG. 31 shows a Boeing commercial transport wing taken at a wind speed of M=0.90. The plot in the upper right corner represents luminescence intensity.

To demonstrate differences in pressure patterns resulting from changing wind speeds, digitized images of another Boeing commercial transport wing at two different Mach numbers are shown in FIGS. 30 and 31. False color has also been assigned to these images to accentuate differences in the pressure distribution. In FIG. 30, the wind speed is $M_\infty = 0.70$. A narrow shock wave is visible on the leading edge of the wing. At a higher wind speed, drastic differences in pressure distribution over the wing's surface are realized, as is seen in FIG. 32. The wing is at the same angle of attack (3 degrees) but the wind speed is $M_\infty = 0.90$. Notice the difference in the location and shape of the shock wave. This type of data provides visual information which can be used by aeronautical engineers for immediate "on-site" evaluation of a wing design.

Video recordings of a wing in an operational wind tunnel by means of a video cassette recorder are very valuable for analyzing dynamic pressure information. On several occasions, luminescence data recorded on video tape has provided real-time dynamic information never before seen by conventional methods. For instance, a small dynamic pressure wave on the trailing edge of one Boeing commercial transport wing has been discovered that moves too quickly to be reliably captured by electronic pressure scanners. The existence of this "wavelet" is not yet fully understood, but such discoveries may lead to new aerodynamic design criteria.

EFFECT OF BACKING ON LUMINESCENT INTENSITY

The data in Table 1 shows that a white backing greatly enhances observed luminescence:

TABLE 1

| Sample | % I |
| --- | --- |
| film sprayed on white paint on an aluminum plate | 100 |
| film on aluminum plate | 15.0 |
| film on TLC plate | 29.2 |
| film on clear glass | 3.5 |
| flim on black paper | 1.2 |

(Note: all films were sprayed so as to have approximately the same thickness.)

While the present invention has been described in conjunction with preferred embodiments, one of ordinary skill after reading the foregoing specification will be able to effect various changes, substitutions of equivalents, and alterations of the subject matter set forth herein. It is therefore intended that the protection granted by letters patent hereon be limited only by the definitions contained in the appended claims and equivalents thereof.

The embodiments of the invention in which an exclusive property or privilege is claimed are defined as follows:

1. A method of measuring the pressure of an oxygen-containing gas on a surface, which comprises:
   providing an aerodynamic surface coated with an oxygen-permeable film comprising sensors A, B, and C, wherein sensor A, upon irradiation with exciting wavelength $\lambda_a$, produces luminescence at an emission wavelength $\lambda_A$ of intensity $I_A$ that is dependent on both temperature and oxygen pressure, sensor B, upon irradiation with exciting wavelength $\lambda_b$, produces luminescence at an emission wavelength $\lambda_B$ of intensity $I_B$ that is dependent on temperature and independent of oxygen pressure, sensor C, upon irradiation with exciting wavelength $\lambda_c$, produces luminescence at an emission wavelength $\lambda_C$ of intensity $I_C$ that is independent of oxygen pressure and independent of temperature;

causing an oxygen-containing gas to flow over said surface;

irradiating at least a portion of said surface with $\lambda_a$ and $\lambda_b$, or with $\lambda_a$, $\lambda_b$, and $\lambda_c$, while said oxygen-containing gas is flowing over said irradiated surface;

detecting either $I_A$ and $I_B$, or $I_A$, $I_B$, and $I_C$, for a plurality of smaller areas of said irradiated surface; and, comparing the $I_A$ value for each smaller area to the corresponding $I_B$ or $I_C$ value for said smaller area to calibrate said $I_A$ value to a reference temperature or reference condition, thereby resulting in an indication of the pressure of said gas on said surface.

2. The method according to claim 1, which further comprises converting said calibrated $I_A$ values to a digitized image, a photograph, or a video recording.

3. The method of claim 1, wherein said method is carried out in a wind tunnel.

4. The method according to claim 1, wherein said sensor A comprises a porphyrin.

5. The method of claim 4, wherein said porphyrin is platinum octaethylporphyrin.

6. The method according to claim 1, wherein said sensor B comprises rhodamine B.

7. The method according to claim 1, wherein said sensor B comprises yttrium vanadate microcrystals doped with europium.

8. The method according to claim 1, wherein said film comprises a silicone polymer.

9. The method according to claim 1, wherein said oxygen-containing gas comprises air.

10. The method of claim 1, wherein $\lambda_a = \lambda_b = \lambda_c$ and $\lambda_A \neq \lambda_B \neq \lambda_C$.

11. The method of claim 1, wherein $\lambda_a \neq \lambda_b \neq \lambda_c$ and $\lambda_A = \lambda_B = \lambda_C$.

12. The method according to claim 1, wherein irradiating is carried out with a constant light source.

13. The method according to claim 1, wherein irradiating is carried out by means of a flashing light source.

14. The method according to claim 1, wherein said film is coated on a white aerodynamic surface.

15. The method according to claim 1, wherein said surface is stationary.

16. The method according to claim 1, wherein said surface moves through said gas.

17. The method of claim 1, wherein said comparing step comprises comparing $I_B$ from each said smaller area of said surface to a first predetermined calibration curve relating luminescence of sensor B and temperature to obtain a measured temperature of each said smaller area, and using a second predetermined calibration curve relating luminescence of sensor A to temperature to calibrate $I_A$ to a reference temperature, thereby producing a temperature-calibrated $I_A$ measurement, and obtaining a ratio of said temperature-calibrated $I_A$ measurement for each area to $I_C$ for each said area and relating said ratio to the pressure of said gas for each said area.

18. The method of claim 1, further comprising capturing the luminescences of said sensors from each said coated area with a video camera, digitizing said luminescences, using the digitized image produced by sensor B to calibrate the digitized luminescence produced by sensor A to a reference temperature, and using the digitized luminescence produced by sensor C to calibrate the luminescence of sensor A to a reference condition, thereby producing a calibrated $I_A$ value for each coated area that can be related to the pressure of said oxygen-containing gas on said surface.

19. The method of claim 18, which further comprises converting said calibrated $I_A$ value for each area to an analog signal and routing said signal to a video monitor for viewing an image of said surface that indicates the pressure of said gas at each said area.

20. The method of claim 6, wherein said image provides real time qualitative or quantitative gas flow visualization.

21. A pressure-sensitive composition, which comprises a solvent containing therein a plurality of sensors comprising sensors A, B, and C, wherein upon irradiation by an exciting wavelength of light:

sensor A produces luminescence that is dependent upon temperature and oxygen pressure, sensor B produces luminescence that is independent of oxygen pressure and dependent upon temperature, and sensor C produces luminescence that is independent of temperature and oxygen pressure; and molecules that form an oxygen-permeable film containing said sensors upon evaporation of said solvent.

22. The pressure-sensitive paint according to claim 21, wherein sensor A comprises a porphyrin.

23. The pressure-sensitive paint according to claim 22, wherein said porphyrin is platinum octaethylporphyrin.

24. The pressure-sensitive paint according to claim 22, wherein said sensor B comprises rhodamine B.

25. The pressure-sensitive paint according to claim 21, wherein said molecules form a silicone polymer upon evaporation of said solvent.

26. The pressure-sensitive paint according to claim 21, wherein said solvent is a volatile organic liquid.

* * * * *

UNITED STATES PATENT AND TRADEMARK OFFICE
CERTIFICATE OF CORRECTION

PATENT NO. : 5,186,046        Page 1 of 2
DATED : February 16, 1993
INVENTOR(S) : M. P. Gouterman et al.

It is certified that error appears in the above-identified patent and that said Letters Patent is hereby corrected as shown below:

| COLUMN | LINE | |
|---|---|---|
| 3 | 19 | "dependence" should read --dependency-- |
| 3 | 67 | after "at" delete "a" |
| 5 | 11 | "predicated" should read --predicted-- |
| 6 | 62 | "film" should read --films-- |
| 6 | 66 | "well-know" should read --well-known-- |
| 7 | 43 | "preferably" should read --preferred-- |
| 7 | 65 | "molecular" should read --molecule-- |
| 7 | 66 | "may" should read --many-- |
| 8 | 2 | "large" should read --larger-- |
| 8 | 68 | "change" should read --chance-- |
| 9 | 25 | "from" should read --form-- |
| 9 | 27 | "increased" should read --*increased*-- |
| 9 | 28 | "0.8%/ C." should read --0.8 %/°C.-- |
| 9 | 55 | "(e.g. 20 mm)" should read --(e.g., 20 nm)-- |
| 10 | 8 | "broadcast" should read --broadest-- |
| 10 | 22 | "relationship" should read --relationships-- |
| 10 | 43 | "(15);" should read --((15):-- |
| 11 | 27 | "mast" should read --must-- |
| 11 | 58 | "s" should read --is-- |
| 12 | 19 | "evennumbered" should read --even-numbered-- |
| 14 | 32 | "$I_0I$" should read --$I_0/I$-- |
| 14 | 51 | "temperatures" should read --temperature-- |
| 15 | 22 | after "for" delete "a" |
| 15 (Equation (5)) | 63 | "$p/p_o = C + D(i_o/I)$" should read --$p/p_o = C + D(I_o/I)$-- |

UNITED STATES PATENT AND TRADEMARK OFFICE
CERTIFICATE OF CORRECTION

PATENT NO. : 5,186,046

DATED : February 16, 1993

INVENTOR(S) : M. P. Gouterman et al.

It is certified that error appears in the above-identified patent and that said Letters Patent is hereby corrected as shown below:

| COLUMN | LINE | |
|---|---|---|
| 16 | 7 | "wind" should read --wing-- |
| 16 | 31 | "profile" should read --profiles-- |
| 17 | 6 | "and 50.0°C., 23.7°" should read --23.7°C, and 50.0°-- |
| 17 | 25 | "laboratory ," should read --laboratory,-- |
| 17 | 55 | " "wind-on-" should read --"wind-on"-- |
| 19 | 22 | "Genesee/PtOEP" should read --Genessee/PtOEP-- |
| 21 | 2 | "intercepts" should read --intercept-- |
| 21 | 40 | "temperature." should read --temperatures,-- |
| 21 | 45 | "less" should read --*less*-- |
| 24 (Claim 20 | 32 Line 1) | "claim 6," should read --claim 19,-- |

Signed and Sealed this

First Day of February, 1994

Attest:

BRUCE LEHMAN

*Attesting Officer*     *Commissioner of Patents and Trademarks*